(12) United States Patent
Kohno

(10) Patent No.: US 7,315,898 B2
(45) Date of Patent: Jan. 1, 2008

(54) DATA COMMUNICATION SYSTEM, DATA TRANSMISSION APPARATUS, DATA RECEPTION APPARATUS, DATA COMMUNICATION METHOD, AND COMPUTER PROGRAM

(75) Inventor: Michinari Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 10/310,212

(22) Filed: Dec. 4, 2002

(65) Prior Publication Data

US 2003/0120802 A1 Jun. 26, 2003

(30) Foreign Application Priority Data

Dec. 4, 2001 (JP) .......................... P2001-369731

(51) Int. Cl.
G06F 15/16 (2006.01)
H04L 12/26 (2006.01)
H04L 12/28 (2006.01)
H04L 1/08 (2006.01)
H04J 7/00 (2006.01)
H04N 1/00 (2006.01)
G08C 25/02 (2006.01)

(52) U.S. Cl. ....................... 709/230; 709/231; 709/237; 370/252; 370/248; 370/394; 370/213; 395/182.16; 348/13; 714/748

(58) Field of Classification Search ..................... None
See application file for complete search history.

(56) References Cited

U.S. PATENT DOCUMENTS

| 5,444,718 | A | | 8/1995 | Ejzak et al. | |
|---|---|---|---|---|---|
| 5,528,284 | A | * | 6/1996 | Iwami et al. | 348/14.15 |
| 5,918,002 | A | * | 6/1999 | Klemets et al. | 714/18 |
| 6,021,516 | A | * | 2/2000 | Okajima et al. | 714/748 |
| 6,085,252 | A | * | 7/2000 | Zhu et al. | 709/231 |
| 6,275,471 | B1 | * | 8/2001 | Bushmitch et al. | 370/248 |
| 6,965,573 | B1 | * | 11/2005 | Mizukoshi | 370/252 |
| 6,996,624 | B1 | * | 2/2006 | LeCroy et al. | 709/231 |
| 7,123,617 | B1 | * | 10/2006 | Abrol | 370/394 |
| 2002/0095636 | A1 | * | 7/2002 | Tatsumi et al. | 714/748 |
| 2002/0124096 | A1 | * | 9/2002 | Loguinov et al. | 709/230 |
| 2003/0046032 | A1 | * | 3/2003 | Puthiyedath | 702/188 |
| 2006/0126494 | A1 | * | 6/2006 | Dougall et al. | 370/213 |

FOREIGN PATENT DOCUMENTS

| JP | 04-170239 | 6/1992 |
|---|---|---|
| JP | 4170239 | 6/1992 |

(Continued)

*Primary Examiner*—Bunjob Jarcenchonwanit
*Assistant Examiner*—Philip Lee
(74) *Attorney, Agent, or Firm*—Bell, Boyd & Lloyd LLP

(57) ABSTRACT

In a data communication system, the function of automatic repeat request is provided for transmission of packets based on a data communication protocol such as the Real-Time Transport Protocol or the User Datagram Protocol. Lost packets are detected at various timings, for example, when the beginning packet of each frame is received, the final frame of each frame is received, at a time limit of processing, and at a regular interval, and retransmission requests are issued accordingly. A data reception terminal does not issue a retransmission request if associated retransmission data will not be in time for playing with consideration of processing time and roundtrip time, thereby avoiding the transmission of useless retransmission request packets and retransmission packets.

45 Claims, 13 Drawing Sheets

FOREIGN PATENT DOCUMENTS

| | | |
|---|---|---|
| JP | 05-160811 | 6/1993 |
| JP | 5160811 | 6/1993 |
| JP | 07-202856 | 8/1995 |
| JP | 7202856 | 8/1995 |
| JP | 07-283757 | 10/1995 |
| JP | 07-283782 | 10/1995 |
| JP | 09-191314 | 7/1997 |
| JP | 9191314 | 7/1997 |
| JP | 09-247132 | 9/1997 |
| JP | 9247132 | 9/1997 |
| JP | 10-200897 | 7/1998 |
| JP | 10200897 | 7/1998 |
| JP | 11-032077 | 2/1999 |
| JP | 11-262054 | 9/1999 |
| JP | 11-331839 | 11/1999 |
| JP | 2001-111618 | 4/2001 |
| JP | 2001-119437 | 4/2001 |
| JP | 2001111618 | 4/2001 |
| JP | 2001-218276 | 8/2001 |
| JP | 2001218276 | 8/2001 |
| JP | 2001-298407 | 10/2001 |
| JP | 2003-515289 | 4/2003 |

\* cited by examiner

FIG. 3

| VERSION | HEADER LENGTH | TOS | LENGTH | |
|---|---|---|---|---|
| IDENTIFIER | | | FLAGS | FRAGMENT OFFSET |
| TTL | | PROTOCOL | HEADER CHECKSUM | |
| SOURCE IP ADDRESS | | | | |
| DESTINATION IP ADDRESS | | | | |
| OPTIONS | | | | |

FIG. 7

| NAME | VALUE | FUNCTION |
|---|---|---|
| NACK_OPT_SINGLE | 0 | RETRANSMIT ONLY DESIGNATED PACKETS (DEFAULT) |
| NACK_OPT_FORWARD | 1 | RETRANSMIT BLOCK OF PACKETS FROM BEGINNING TO DESIGNATED NUMBER |
| NACK_OPT_BACKWARD | 2 | RETRANSMIT BLOCK OF PACKETS FROM DESIGNATED NUMBER TO END |
| NACK_OPT_ALL | 3 | RETRANSMIT ALL PACKETS WITH DESIGNATED TIMESTAMP |
| NACK_OPT_IGNTS | 4 | RETRANSMIT PACKETS BASED ON NUMBER ONLY AND WITHOUT REGARD TO TIMESTAMPS |

FIG. 9A

| HEAD | FORMAT | PACKET TYPE | PACKET LENGTH |
|------|--------|-------------|---------------|
| SYNCHRONIZATION SOURCE (SSRC) IDENTIFIER ||||
| ECHO-ID ||||

FIG. 9B

| HEAD | FORMAT | PACKET TYPE | PACKET LENGTH |
|------|--------|-------------|---------------|
| SYNCHRONIZATION SOURCE (SSRC) IDENTIFIER ||||
| ECHO-ID ||||
| SERVER PROCESSING TIME ||||

FIG. 10

| HEAD | FORMAT | PACKET TYPE | PACKET LENGTH |
|---|---|---|---|
| SYNCHRONIZATION SOURCE (SSRC) IDENTIFIER ||||
| TIMESTAMP ||||

DATA COMMUNICATION SYSTEM, DATA TRANSMISSION APPARATUS, DATA RECEPTION APPARATUS, DATA COMMUNICATION METHOD, AND COMPUTER PROGRAM

BACKGROUND OF THE INVENTION

The present invention relates to data communication systems, data transmission apparatuses, data reception apparatuses, data communication methods, and computer programs. More specifically, the present invention relates to a data communication system, a data transmission apparatus, a data reception apparatus, a data communication method, and a computer program that serve to improve error resilience in the transfer of packets containing streaming data.

Nowadays, transmission of data including images and audio data via various communications media such as the Internet has become popular and is widely performed. In particular, recent data transmissions over the Internet have been offering an increasing number of streaming transmission services in addition to download transmission services. When transmitting multimedia data such as a video file or an audio file, download transmission involves downloading the data file from a distributing server into a storage medium at a receiver-side terminal and subsequently reading the data from the storage medium. Download transmission does not enable the file to be played until the file has been completely transmitted, which makes it unsuitable for long-time playback or real-time playback.

In contrast, the latter, namely, streaming transmission, involves reading received data while the data is being transmitted from a sender to a receiver. Streaming transmission is widely used by Internet services including Internet telephony, remote videoconferencing, and video-on-demand.

Streaming transmission has been used and developed in systems involving storing, for example, an MPEG (Moving Picture Experts Group) stream, which is generated by MPEG-compression of image data, in IP (Internet Protocol) packets, transmitting the packets over the Internet, and receiving the packets by communications terminals, including personal computers (PCs), personal digital assistants (PDAs), and cellular phones. Streaming transmission is advantageous in performing video-on-demand, streaming distribution of live video images, and realtime communications including videoconferencing and videophones.

One Internet technique suitable for such streaming transmission is the Realtime Transport Protocol (RTP), which is defined in the Internet Engineering Task Force (IETF) Request For Comments (RFC) 1889. RTP-compliant data transmission adds a timestamp serving as time information to a packet. With reference to the timestamp, the time relationship between the sender side and the receiver side is determined. The receiver side reads the data in synchronization without being influenced by delay fluctuations in packet transmission (jitter).

RTP does not ensure real-time data transmission. Since the transport service provided by RTP does not have control over prioritization, setting, and management of packet transmission, RTP packets, as in other packets, may be sent at a delayed time or may be lost on the network. In case of such errors, the receiver side can use only the packets that have arrived within the expected time and read their data. Even if video data or audio data is defective, the data can be read with degraded quality or by compensating for the lack of data.

Packets which are not on time for being read and which are transmitted at a delayed time or packets with errors are discarded by the receiver side. In other words, when packet loss or error occurs, even when the sender side performs high-quality data transmission, the receiver side may not be able to read the data while maintaining the quality. In particular, when there are errors greater than or equal to $10^{-5}$ in wired sections or $10^{-3}$ in wireless sections, RTP-compliant data transmission has a problem maintaining the quality of distributed media.

One scheme for solving the problem in RTP-compliant data transmission involves transmission of a packet retransmission request and a retransmission packet in accordance with the TCP (Transmission Control Protocol), which is highly reliable in data transmission. Although TCP has a high error resilience, TCP has a low throughput and large delay. When a packet is retransmitted, the packet may not be on time for being read. This makes it difficult to implement real-time communications.

One possible error correction technique for correcting packet errors is, for example, Forward Error Correction (FEC). FEC transmits FEC data serving as redundant data for performing error correction. When an error occurs, the receiver side corrects the error on the basis of the FEC data. FEC is advantageous over Automatic Repeat reQuest (ARQ) in that FEC has a reduced delay time since there is no delay caused by retransmission. However, FEC adds redundant data, and FEC thus has a lower throughput. Furthermore, it is difficult to determine optimal FEC data to be added in accordance with network status, so that FEC is always susceptible to the problem of a processing-time overhead.

SUMMARY OF THE INVENTION

An advantage of the present invention is, therefore, to provide a data communication system, a data transmission apparatus, a data reception apparatus, a data communication method, and a computer program that allows efficient transfer of data to be played in real time, such as data for video-on-demand or videoconferencing, and that allow the data to be played without degrading quality even if an error or a packet loss occurs.

The present invention, in one embodiment, provides a data communication system for transferring streaming data, including a data transmission apparatus and a data reception apparatus. The data transmission apparatus includes a packet transmission processing unit for transmitting a number of data packets containing transmission data, and a retransmission control unit for extracting one or more data packets to be retransmitted according to a retransmission-request message packet received from the data reception apparatus. The data reception apparatus includes a packet reception processing unit for receiving the number of data packets transmitted from the data transmission apparatus, and a retransmission-request processing control unit for determining whether or not to transmit a retransmission-request message packet that serves as a data-packet retransmission request to the data transmission apparatus, based on detection of a lost packet or an error in the number of data packets transmitted from the data transmission apparatus. The retransmission-request processing control unit determines whether one or more retransmission data packets associated with the retransmission request can be received in time for processing relating to playing of data contained in the one or more retransmission data packets, and determines to transmit the retransmission request on condition that the one or more retransmission data packets can be received in time.

The data communication system in one embodiment may be such that the data contained in the number of data packets is encoded data, and that the retransmission-request processing control unit of the data reception apparatus determines whether the one or more retransmission data packets associated with the retransmission request can be received in time for processing, including decoding, relating to playing of the data contained in the one or more retransmission data packets.

The data communication system may in an embodiment be such that the retransmission request is a message packet including one or more sequence numbers that serve as identification data of one or more data packets to be retransmitted, and also including data of a designated count of duplicate retransmission of the one or more data packets associated with the one or more sequence numbers, and that the data transmission apparatus executes duplicate retransmission of the one or more data packets associated with the one or more sequence numbers in accordance with the data of the designated count of duplicate retransmission designated in the retransmission-request message packet.

In an embodiment, the data communication system may also be such that the number of data packets transferred between the data transmission apparatus and the data reception apparatus includes motion picture data, and that the retransmission-request processing control unit of the data reception apparatus, upon receiving a final data packet in a number of data packets containing data constituting a single picture frame of the motion picture data, detects a lost data packet or an error in the number of data packets containing the data constituting the picture frame to which the final data packet belongs.

The data communication system may in one embodiment be such that the number of data packets transferred between the data transmission apparatus and the data reception apparatus includes motion picture data, and that the retransmission-request processing control unit of the data reception apparatus, upon receiving a beginning data packet in a number of data packets containing data constituting a single picture frame of the motion picture data, detects a lost data packet or an error in a number of data packets containing data constituting a picture frame previous to the picture frame to which the beginning data packet belongs.

In one embodiment, the data communication system may also be such that the retransmission-request processing control unit of the data reception apparatus detects a lost data packet or an error in the received data packets on the basis of a time limit of a retransmission request for data contained in a data packet to be in time for processing relating to playing of the data.

The data communication system may also be such that in one embodiment the retransmission-request processing control unit of the data reception apparatus detects a lost data packet or an error in the received data packets on the basis of a regular time interval.

The data communication system may in an embodiment be such that the retransmission-request processing control unit of the data reception apparatus controls transmission of an echo packet to the data transmission apparatus and reception of an echo-reply packet in response to the echo packet in order to measure a round-trip time between the data transmission apparatus and the data reception apparatus, and determines whether the one or more retransmission data packets associated with the retransmission request can be received in time for the processing relating to playing of the data contained in the one or more retransmission data packets, based on the roundtrip time calculated based on the echo packet and the echo-reply packet.

The data communication system may also in one embodiment be such that the retransmission-request message packet created by the data reception apparatus includes at least one of sequence-number designation data designating one or more data packets and timestamp designation data designating a timestamp for one or more packets, and also includes an option value designating a range of the retransmission request, and that the retransmission control unit of the data transmission apparatus extracts one or more packets to be retransmitted based on at least one of the sequence-number designation data and the timestamp designation data, and the option value, included in the retransmission-request message packet received from the data reception apparatus.

In an embodiment, the data communication system may be such that each of the number of data packets has a format according to the Real-Time Transport Protocol, which serves as a data transfer protocol, and that the retransmission request has a format according to the Real-Time Transport Control Protocol, which serves as a control protocol.

The data communication system may also be such that in an embodiment the data reception apparatus transmits a retransmission request for a number of data packets using a single retransmission-request message packet to the data transmission apparatus.

The data communication system may also be such that in an embodiment the data reception apparatus transmits an acknowledgement of reception of a number of data packets using a single reception-acknowledgement message packet to the data transmission apparatus.

The present invention, in another embodiment, provides a data transmission apparatus for transmitting streaming data. The apparatus includes a packet transmission processing unit for transmitting a number of data packets containing transmission data, and a retransmission control unit for extracting one or more data packets to be retransmitted according to a retransmission request received from a data reception apparatus. The data transmission apparatus executes duplicate retransmission of one or more designated data packets in accordance with data of a designate count of duplicate retransmission designated in a retransmission-request message packet received from the data reception apparatus.

In yet another embodiment of the present invention, a data transmission apparatus for transmitting streaming data is provided. The apparatus includes a packet transmission processing unit for transmitting a number of data packets containing transmission data, and a retransmission control unit for extracting one or more data packets to be retransmitted according to a retransmission request received from a data reception apparatus. The retransmission control unit extracts one or more packets to be retransmitted based on at least one of sequence-number designation data designating one or more data packets and timestamp designation data for one or more packets, and an option value, included in a retransmission-request message packet received from the data reception apparatus.

The present invention, in yet another embodiment, provides a data reception apparatus for receiving streaming data. The apparatus includes a packet reception processing unit for receiving a number of data packets transmitted from a data transmission apparatus, and a retransmission-request processing control unit for determining whether or not to transmit a retransmission-request message packet that serves as a data-packet retransmission request to the data transmission apparatus, based on detection of a lost packet or an error in the number of data packets transmitted from the data transmission apparatus. The retransmission-request processing control unit determines whether one or more retransmission data packets associated with the retransmission request can be received in time for processing relating to playing of data contained in the one or more retransmission data packets, and determines to transmit the retransmission request on condition that the one or more retransmission data packets can be received in time.

The data reception apparatus in one embodiment may be such that the data contained in the number of data packets is encoded data, and that the retransmission-request processing control unit determines whether the one or more retransmission data packets associated with the retransmission request can be received in time for processing, including decoding, relating to playing of the data contained in the one or more retransmission data packets.

In an embodiment, the data reception apparatus may also be such that a message packet including one or more sequence numbers that serve as identification data of one or more data packets to be retransmitted, and also including data of a designated count of duplicate retransmission of the one or more data packets associated with the one or more sequence numbers is created and transmitted to the data transmission apparatus.

The data reception apparatus in an embodiment may also be such that the number of data packets received by the data reception apparatus includes motion picture data, and that the retransmission-request processing control unit, upon receiving a final data packet in a number of data packets containing data constituting a single picture frame of the motion picture data, detects a lost data packet or an error in the number of data packets containing the data constituting the picture frame to which the final data packet belongs.

The data reception apparatus may also be such that in one embodiment the number of data packets received by the data reception apparatus includes motion picture data, and that the retransmission-request processing control unit, upon receiving a beginning data packet in a number of data packets containing data constituting a single picture frame of the motion picture data, detects a lost data packet or an error in a number of data packets containing data constituting a picture frame previous to the picture frame to which the beginning data packet belongs.

In one embodiment, the data reception apparatus may also be such that the retransmission-request processing control unit detects a lost data packet or an error in the received data packets on the basis of a time limit of a retransmission request for data contained in a data packet to be in time for processing relating to playing of the data.

The data reception apparatus may also in an embodiment be such that the retransmission-request processing control unit detects a lost data packet or an error in the received data packets on the basis of a regular time interval.

The data reception apparatus may in an embodiment be such that the retransmission-request processing control unit controls transmission of an echo packet to the data transmission apparatus and reception of an echo-reply packet in response to the echo packet in order to measure a round-trip time between the data transmission apparatus and the data reception apparatus, and determines whether the one or more retransmission data packets associated with the retransmission request can be received in time for the processing relating to playing of the data contained in the one or more retransmission data packets, based on the round-trip time calculated based on the echo packet and the echo-reply packet.

The data reception apparatus may also be such that in one embodiment a retransmission-request message packet including at least one of sequence-number designation data designating one or more data packets and timestamp designation data designating a timestamp for one or more packets, and also including an option value designating a range of the retransmission request is created and transmitted to the data transmission apparatus.

The data reception apparatus may also be such that each of the number of data packets in an embodiment has a format according to the Real-Time Transport Protocol, which serves as a data transfer protocol, and that the retransmission request has a format according to the Real-Time Transport Control Protocol, which serves as a control protocol.

In an embodiment, the data reception apparatus may also be such that a retransmission request for a number of data packets is transmitted to the data transmission apparatus using a single retransmission-request message packet.

The data reception apparatus in an embodiment may also be such that an acknowledgement of reception of a number of data packets is transmitted to the data transmission apparatus using a single reception-acknowledgement message packet.

The present invention, in another embodiment, provides a data communication method for transferring streaming data between a data transmission apparatus and a data reception apparatus. The data transmission apparatus executes a packet transmission processing step of transmitting a number of data packets containing transmission data, and a retransmission control step of extracting one or more data packets to be retransmitted according to a retransmission-request message packet received from the data reception apparatus. The data reception apparatus executes a packet reception processing step of receiving the number of data packets transmitted from the data transmission apparatus, and a retransmission-request processing control step of determining whether or not to transmit a retransmission-request message packet that serves as a data-packet retransmission request to the data transmission apparatus, based on detection of a lost packet or an error in the number of data packets transmitted from the data transmission apparatus. In the retransmission-request processing control step, it is determined whether one or more retransmission data packets associated with the retransmission request can be received in time for processing relating to playing of data contained in the one or more retransmission data packets, and it is determined that the retransmission request be transmitted on condition that the one or more retransmission data packets can be received in time.

In one embodiment of the data communication method, the data contained in the number of data packets is encoded data, and the retransmission-request processing control step executed at the data reception apparatus includes a step of determining whether the one or more retransmission data packets associated with the retransmission request can be received in time for processing, including decoding, relating to playing of the data contained in the one or more retransmission data packets.

The data communication method may also be such that in an embodiment the retransmission request is a message packet including one or more sequence numbers that serve as identification data of one or more data packets to be retransmitted, and also including data of a designated count of duplicate retransmission of the one or more data packets associated with the one or more sequence numbers. Further, the data transmission apparatus executes duplicate retransmission of the one or more data packets associated with the one or more sequence numbers in accordance with the data of the designated count of duplicate retransmission designated in the retransmission-request message packet.

The data communication method may also in one embodiment be such that the number of data packets transferred between the data transmission apparatus and the data reception apparatus includes motion picture data, and that the retransmission-request processing control step executed at the data reception apparatus includes a step of detecting, upon receiving a final data packet in a number of data packets containing data constituting a single picture frame of the motion picture data, a lost data packet or an error in the number of data packets containing the data constituting the picture frame to which the final data packet belongs.

The data communication method may also be such that in an embodiment the number of data packets transferred between the data transmission apparatus and the data reception apparatus includes motion picture data, and that the retransmission-request processing control step executed at the data reception apparatus includes a step of detecting, upon receiving a beginning data packet in a number of data packets containing data constituting a single picture frame of the motion picture data, a lost data packet or an error in a number of data packets containing data constituting a picture frame previous to the picture frame to which the beginning data packet belongs.

In one embodiment, the data communication method may also be such that the retransmission-request processing control step executed at the data reception apparatus includes a step of detecting a lost data packet or an error in the received data packets on the basis of a time limit of a retransmission request for data contained in a data packet to be in time for processing relating to playing of the data.

The data communication method may in one embodiment be such that the retransmission-request processing control step executed at the data reception apparatus includes a step of detecting a lost data packet or an error in the received data packets on the basis of a regular time interval.

The data communication method may also be such that in one embodiment the data reception apparatus further executes a step of controlling transmission of an echo packet to the data transmission apparatus and reception of an echo-reply packet in response to the echo packet in order to measure a round-trip time between the data transmission apparatus and the data reception apparatus. The retransmission-request processing control step further includes a step of determining whether the one or more retransmission data packets associated with the retransmission request can be received in time for the processing relating to playing of the data contained in the one or more retransmission data packets, based on the round-trip time calculated based on the echo packet and the echo-reply packet.

In an embodiment, the data communication method may be such that the retransmission-request message packet created by the data reception apparatus includes at least one of sequence-number designation data designating one or more data packets and timestamp designation data designating a timestamp for one or more packets, and also includes an option value designating a range of the retransmission request. In the retransmission control step executed at the data transmission apparatus, one or more packets to be retransmitted are extracted based on at least one of the sequence-number designation data and the timestamp designation data, and the option value, included in the retransmission-request message packet received from the data reception apparatus.

The data communication method in one embodiment may also be such that each of the number of data packets has a format according to the Real-Time Transport Protocol, which serves as a data transfer protocol, and that the retransmission request has a format according to the Real-Time Transport Control Protocol, which serves as a control protocol.

In one embodiment, the data communication method may also be such that the data reception apparatus further executes a step of transmitting a retransmission request for a number of data packets to the data transmission apparatus using a single retransmission-request message packet.

The data communication method in one embodiment may also be such that the data reception apparatus further executes a step of transmitting an acknowledgement of reception of a number of data packets to the data transmission apparatus using a single reception-acknowledgement message packet.

The present invention, in another embodiment, provides a computer readable medium storing a computer program for receiving streaming data. The computer program includes a packet reception processing step of receiving a number of data packets transmitted from a data transmission apparatus, and a retransmission-request processing control step of determining whether or not to transmit a retransmission-request message packet that serves as a data-packet retransmission request to the data transmission apparatus, based on detection of a lost packet or an error in the number of data packets transmitted from the data transmission apparatus. The retransmission-request processing control step includes a step of determining whether one or more retransmission data packets associated with the retransmission request can be received in time for processing relating to playing of data contained in the one or more retransmission data packets, and determining that the retransmission request be transmitted on condition that the one or more retransmission data packets can be received in time.

A computer program according to an embodiment of the present invention can be provided, for example, for a general-purpose computer system that is capable of executing various programs, via a computer-readable storage medium for example, a recording medium such as a CD, an FD, or an MO, or via a communication medium such as a network. By providing the program in a computer-readable form, the computer system is allowed to execute processes according to the program.

A system referred to herein, in an embodiment, is a logical combination of a number of apparatuses that are not necessarily disposed in the same casing.

Additional features and advantages of the present invention are described in, and will be apparent from, the following Detailed Description of the Invention and the Figures.

BRIEF DESCRIPTION OF THE FIGURES

FIG. 3 is a diagram showing a format of an IP packet that is transferred in a data communication system according to an embodiment of the present invention.

FIG. 7 is a diagram showing the functions of option values in a NACK-RTCP packet that is transferred by a data communication system according to an embodiment of the present invention.

FIGS. 9A and 9B are diagrams showing formats of an ECHO-RTCP packet and an ECHO-REPLY-RTCP packet, respectively, that are transferred in a data communication system according to an embodiment of the present invention.

FIG. 10 is a diagram showing a format of an EOS-RTCP packet that is transferred in a data communication system according to an embodiment of the present invention.

DETAILED DESCRIPTION OF THE INVENTION

Overview of System and Transmission/Reception of Data

Figure 1:
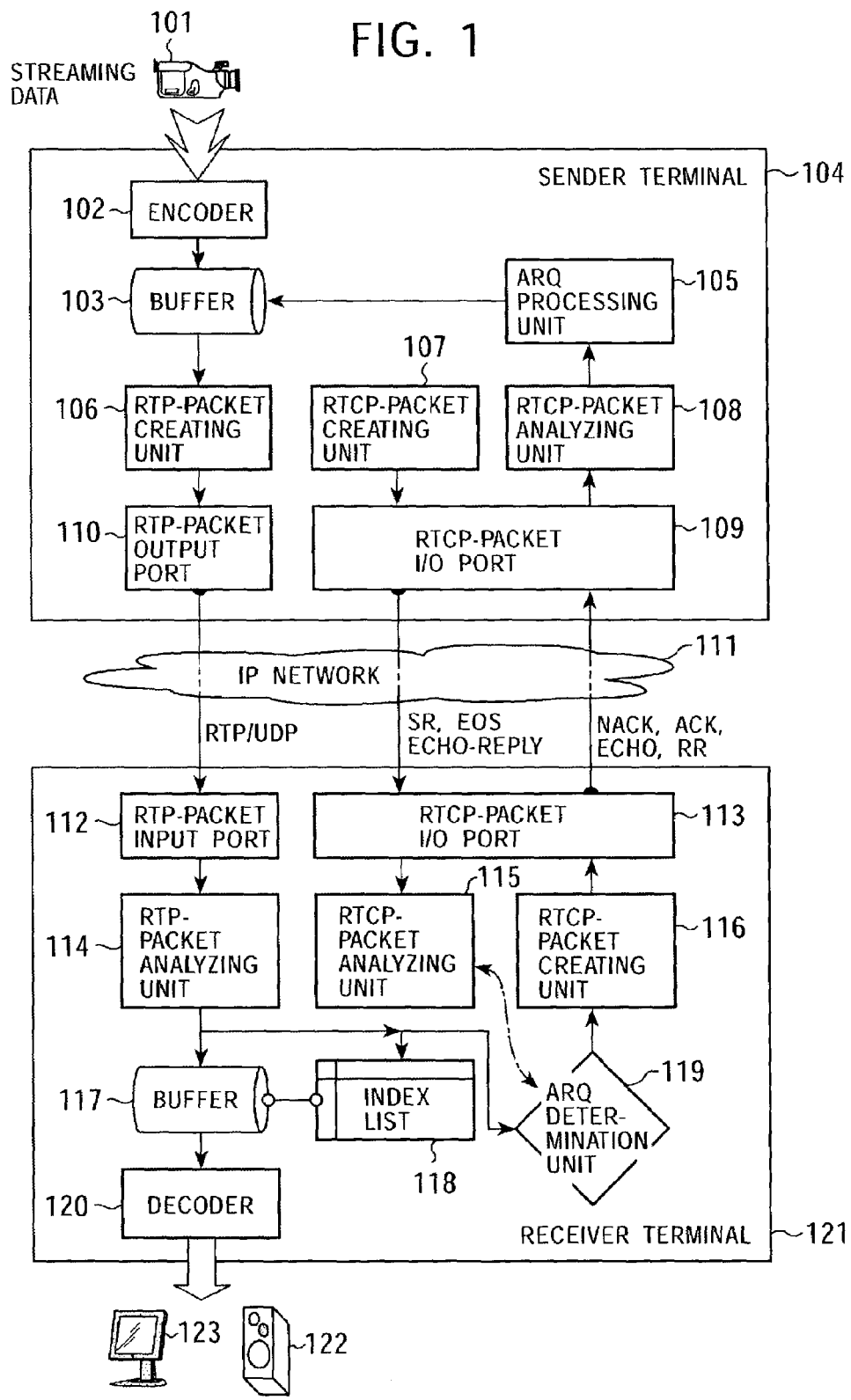
FIG. 1 is a diagram showing the configuration of a data communication system according to an embodiment of the present invention.

An overview of a system according to an embodiment of the present invention and transmission and reception of data will be described with reference to FIG. 1. In a data communication system shown in FIG. 1, a sender terminal 104 transmits video data, audio data, or the like in packets to a receiver terminal 121. The data to be transferred includes, for example, video and audio data captured by a video camera 101. Alternatively, the data to be transferred may include, for example, data input from a storage medium such as a CD or a DVD, or data received, for example, from an external network or via a satellite. The following description will be made mainly in the context of an example where motion picture data captured by the video camera 101 is transferred from the sender terminal 104 to the receiver terminal 121.

The motion picture data captured by the video camera 101 is encoded, for example, MPEG-compressed, by an encoder 102 of the sender terminal 104, and the encoded data is accumulated in a buffer 103. The encoded data accumulated in the buffer 103 is output to an RTP-packet creating unit 106 for generating data packets (hereinafter simply referred to as packets) based on the Real-Time Transport Protocol (RTP), where RTP packets containing the encoded data are created. The RTP packets containing the encoded data, created in the RTP-packet creating unit 106, are transferred to an RTP-packet output port 110 based on the RTP and then forwarded onto an IP network 111. The RTP-packet creating unit 106 and the RTP-packet output port 110 of the sender terminal 104 constitute, a packet-transmission processing unit.

Figure 2:
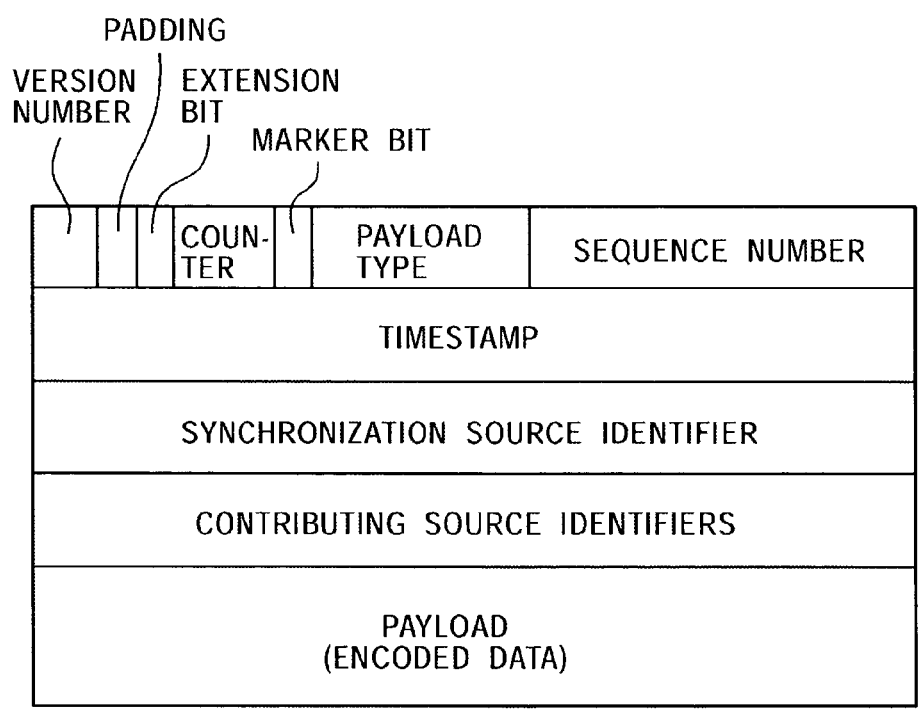
FIG. 2 is a diagram showing a format of an RTP packet that is transferred in a data communication system according to an embodiment of the present invention.

The RTP-packet creating unit 106 creates packets containing the encoded data as payloads thereof by attaching RTP headers to the payload data. FIG. 2 illustrates a format of an RTP packet according to an embodiment of the present invention. An RTP header includes fields of version number (v), padding (P), presence/absence of extension header (X), the number of sources (counter), marker information (marker bit), payload type, sequence number, timestamp, synchronization source (SSRC) identifier, and contributing source (CSRC) identifiers. When the RTP packets are depacketized at a data-receiving end, processing time is controlled based on timestamps included in the RTP headers so as to allow video or audio data to be played in real time. For example, when RTP packets contain encoded motion picture data, a common timestamp is set in a number of RTP packets belonging to a single picture frame, and in the RTP header of the final packet of each frame, a flag indicating the end of the frame is set.

Furthermore, IP headers are attached to the packets with RTP headers. FIG. 3 shows a format of an IP header in an IP packet in one embodiment of the present invention. The IP header includes fields of version indicating IPv4, IPv6, etc., header length, TOS (Type of Service) indicating priority information, packet length, packet identifier, flags that serve as control information relating to fragmentation of the data in the IP layer, fragment offset indicating position of fragmented data, TTL (Time to Live) indicating information regarding the length of time before the data is discarded, protocol to be used in the upper layer (4 for IP, 6 for TCP, 17 for UDP, etc.), header checksum, source IP address, and destination IP address.

Referring back to FIG. 1, a data reception process will be described. An RTP-packet input port 112 of the receiver terminal 121 receives RTP packets from the sender terminal 104 via the IP network 111. The RTP packets received are analyzed by a packet analyzing unit 114. The RTP-packet input port 112 and the packet analyzing unit 114 of the receiver terminal 121 constitute a packet reception processing unit. More specifically, the packet analyzing unit 114 analyzes a header portion and a data portion of each of the packets. The payload data (i.e., the encoded data) extracted from the packets is accumulated in a buffer 117. Position data indicating positions of the extracted data in the buffer and header information associated with the data are accumulated as an index list 118.

The encoded data accumulated in the buffer 117 is passed to a decoder 120 at timings controlled based on the header information accumulated in the index list 118, and the encoded data is decoded by the decoder 120. For example, each frame constituting a motion picture is composed of data contained in a number of packets, and a common timestamp is set in the headers of the RTP packets containing data constituting a single picture frame. Thus, based on timestamps in the header information accumulated in the index list 118, packets with a common timestamp are passed to the decoder 120 as a group of encoded data constituting a single picture frame, thereby allowing the decoder 120 to decode data on a frame-by-frame basis. The data decoded by the decoder 120 is transferred to a display 123 or a speaker 122 that serves as a player, whereby the data is output and played.

If all the packets to be transferred from the sender terminal 104 to the receiver terminal 121 are received smoothly without error, the data is played in real time successfully on the receiver terminal 121. In reality, however, playing error or degradation in quality of playing data often occurs due to various factors such as loss of packets, delay, and data error in packets during transmission over a network.

In the system according to an embodiment of the present invention, the packet analyzing unit 114 of the receiver terminal 121 detects error such as packet loss, and if an error is detected, an ARQ (Automatic Repeat reQuest) determination unit 119 determines whether or not to issue a request for packet retransmission with consideration of real-time playing sequence. The ARQ determination unit 119 functions as a retransmission request processing control unit for determining, based on whether an error in a data packet received from a data transmission apparatus or a lost data packet is detected, whether or not to transmit a retransmission request message packet that serves as a data packet retransmission request to the data transmission apparatus. Processing in the ARQ determination unit 119 will be described in detail below.

If the ARQ determination unit 119 determines that a retransmission request be issued, the receiver terminal 121 creates, in an RTCP-packet creating unit 116 thereof, a retransmission request NACK (Negative ACKnowledge)-RTCP (Real-Time Transport Control Protocol) packet containing data identifying a packet to be retransmitted, and transmits the NACK-RTCP packet to the sender terminal 104 via an RTCP-packet input/output port 113.

When the NACK-RTCP packet, indicating a retransmission request from the receiver terminal 121, is received at an RTCP-packet input/output port 109 of the sender terminal 104, the NACK-RTCP packet received is analyzed in an RTCP-packet analyzing unit 108, and the result is passed to an ARQ processing unit 105. In order to execute packet retransmission in response to the retransmission request, the ARQ processing unit 105 extracts from the buffer 103 the packet designated in the NACK-RTCP packet, and the extracted packet is retransmitted via the RTP-packet output port 110. The ARQ processing unit 105 functions as a retransmission control unit for extracting a data packet to be retransmitted according to a retransmission request message packet received from a data reception terminal. In the packet retransmission process in response to the retransmission request based on the NACK-RTCP packet, the retransmission packet is transmitted in duplicate as determined by the ARQ processing unit 105, for example, if a duplicate transmission is designated in the NACK-RTCP packet. These processes will be described in more detail below.

When the sender terminal 104 detects completion of the stream data to be transmitted, the sender terminal 104 transmits an RTCP packet containing an EOS (End of Stream) message created by an RTCP-packet creating unit 107 to the receiver terminal 121 to explicitly declare the end of the data stream.

In the system according to an embodiment of the present invention, the ARQ processing unit 105 determines whether or not to request retransmission of a lost packet with consideration of real-time playing. ARQ (Automatic Repeat reQuest), which is a method of automatic retransmission request in data transfer, is known as a very effective error correction method. Various methods of ARQ have been proposed and implemented, such as SAW (Stop And Wait), GBN (Go Back N), and SR (Selective Repeat). This embodiment will be described in the context of an example where the SR error correction, which yields high throughput, is used as a basic algorithm for implementing ARQ.

The SR method ideally requires buffers of unlimited sizes at the sender and the receiver. Thus, various methods have been proposed, for example, a method in which the method is changed from the SR method to another retransmission method when a buffer overflow has occurred or is likely at the receiver, or a method in which copies of packets are always transmitted to avoid a buffer overflow. In the error correction function in this embodiment, however, as opposed to the types of ARQ in which the top priority is complete transmission of data, such as in PHS, TCP, or data link layer, priority is given to reception of as much required data as possible within a time limit of packet reception that is estimated based on a time for processing received data at the receiver. Thus, ARQ is continued by the SR method without changing to the ST method or GBN method. Furthermore, the receiver controls the buffer so as to avoid a buffer overflow, and transmits data efficiently.

In an embodiment of the present invention, a request for retransmitting a packet that has been lost during transmission is issued by sending a NACK (Negative ACKnowledge) packet based on the Real-Time Transport Control Protocol (RTCP) defined in RFC 1889. RFC 1889 recommends that an interval of five seconds or longer be provided between consecutive transmissions of RTCP packets. However, when an interval of five seconds or longer is provided between retransmission requests, a buffer overflow occurs at the receiver, and moreover, it is impossible to retransmit data in time for playing. Because of the real-time nature of streaming data, a retransmission request must be issued as soon as possible and an associated data packet must be retransmitted as soon as the retransmission request is received so that the retransmitted packet will be in time. Thus, a NACK packet used for ARQ must be transmitted from the receiver to the sender actively at a desired timing as required, so that the present invention does not follow the recommended value, and a NACK packet is transmitted at an arbitrary timing as required.

Furthermore, RFC 1889 suggests that an RTCP bandwidth be 5%. The minimum unit of a retransmission packet in the embodiment of the present invention is as small as sixteen bytes, so that retransmission request will not excessively use bandwidth. Real data of video data or the like is transmitted based on RTP (a packet format thereof is shown in FIG. 2) defined in RFC 1889 in this embodiment. Alternatively, other protocols such as the User Datagram Protocol (UDP) may be used if a sequence number is included in each packet.

When transferring data for real-time playing, processing time is limited, so that the round-trip time (RTT) between transmission and reception is an important parameter. If the RTT is large, when a retransmission request is issued from the data reception terminal to the data transmission terminal, it takes time for the retransmission-request packet to arrive at the data transmission terminal, for extracting and retransmitting retransmission packets containing designated data from the data reception terminal, and for receiving the retransmission packets at the data reception terminal. Thus, even if the received data is passed to a decoder at the data reception terminal, in some cases, the data is not decoded in time for real-time playing. Although the likelihood of improving the correction rate will be increased if retransmission requests are issued regardless of whether associated retransmissions will be in time, transmission of the retransmission-request packets and the associated retransmission packets causes a congestion in network traffic, resulting in the problem of an overhead due to the transmission of these redundant data.

Furthermore, by grasping the RTT between transmission and reception in advance at the data reception terminal, the data reception terminal is allowed to grasp a time between issuance of a retransmission request and reception of an associated retransmission packet. This allows the data reception terminal to determine a time limit for a retransmission request for associated data to be played in real time at the data reception terminal. In the system according to the embodiment of the present invention, the ARQ determination unit of the reception terminal determines a time limit for a retransmission request based on the RTT, and transmits a NACK-RTCP packet, which serves as a retransmission request, based on the determination.

In order to maintain real-time playing with ARQ, the RTT between transmission and reception must be measured constantly. In the system according to an embodiment of the present invention, the data reception terminal actively measures the RTT, updates the RTT between transmission and reception, which changes depending on network status or the like and determines whether or not to transmit a NACK-RTCP packet, which serves as a retransmission request, based on the latest RTT.

The sender is allowed to calculate the RTT based on a sender report (SR) and a receiver report (RR) defined in RTCP. However, the data reception terminal is responsible for determining whether or not to transmit a NACK-RTCP packet, which serves as a retransmission request, based on status of real-time playing. Thus, it is preferred that the data reception terminal is allowed to obtain, as required, information regarding the RTT with consideration of network status. Accordingly, in the system according to the present invention, the data reception terminal is allowed to calculate the RTT actively. More specifically, the data reception terminal calculates the RTT by transmitting an ECHO packet and receiving an ECHO-REPLY packet. These processes will be described in detail below.

The data transmission terminal, upon receiving a NACK-RTCP packet, which serves as a packet retransmission request, from the data reception terminal, transmits packets to be retransmitted as specified in the NACK-RTCP packet together with current packets for distribution. The data transmission terminal executes a distribution scheduling function based on priorities, and retransmits packets according to the distribution schedule.

The automatic retransmission request based on ARQ can be effectively used by using only a NACK-RTCP packet, which serves as a packet retransmission request. However, in this embodiment, an ACK (ACKnowledge) message, which serves as a positive acknowledgement of reception of a packet from the reception terminal, is also used as a reply packet to the data transmission terminal. Transmission of the ACK message allows the buffer holding packets at the sender to be actively cleared as soon as possible, thereby serving to reduce the risk of buffer overflow.

Furthermore, the transmission terminal is allowed to use an EOS (End of Stream) message explicitly declaring the end of streaming data to be distributed. Use of the EOS message allows the receiver to recognize the end of the streaming data. Thus, after the final frame has been received, the receiver is prevented from transmitting a NACK packet with an expectation for a next frame yet to arrive.

The reception terminal is allowed to measure an interval of data reception, and a time passed since a NACK packet is transmitted or the like by a timer thereof. Although it is possible to recognize the end of data when a time measured by the timer reaches a threshold value, reception of an EOS message also allows recognition of the end of streaming data to be distributed. Thus, completion of reception can be detected earlier than by the timer. If an EOS message is not used or if an EOS message is lost, a retransmission packet will not be sent from the sender even if a NACK-packet is transmitted. Thus, in this case, completion of reception is detected by the timer.

Processing at Data Transmission Terminal

Figure 4:
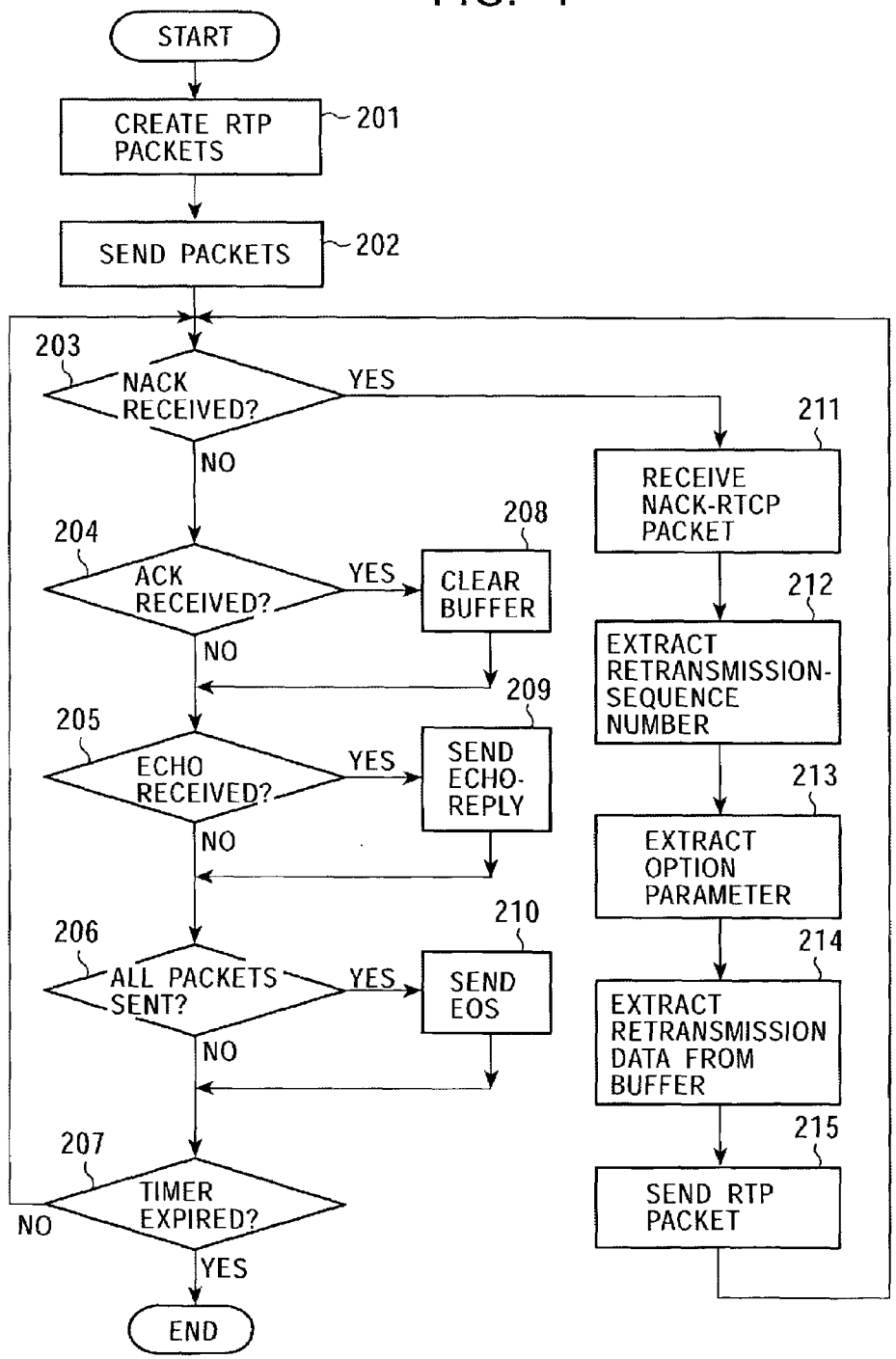
FIG. 4 is a flowchart showing a procedure of processes executed at a data transmission terminal of a data communication system according to an embodiment of the present invention.

A procedure of processing at a data transmission terminal will be described with reference to a flowchart shown in FIG. 4. FIG. 4 is a flowchart showing processes to be executed at the sender terminal 104 shown in FIG. 1. The data transmission terminal, in an encoder thereof, encodes, for example, MPEG-compresses, data captured, for example, by a video camera, or supplied from a storage medium such as a DVD, a CD, or a hard disk, and creates packets containing the encoded data as payloads thereof. The flowchart in FIG. 4 shows the packet creation process and subsequent processes.

In step S201, the data transmission terminal creates RTP packets containing data to be transmitted as payloads thereof. Each of the RTP packets has a format described earlier with reference to FIG. 2 and includes a timestamp in the header thereof. For example, when motion picture data is transmitted, a common timestamp is set in packets containing encoded data belonging to a single picture frame, and incremented timestamps are set as the motion picture proceeds to subsequent frames.

An example of timestamp setting will be described below with reference to a time sequence chart regarding transmission of packets, shown in FIG. 5. A timestamp 12,000, shown on the sender side, is assigned to a number of RTP packets (with sequence numbers of 1 to 6) containing, as payloads thereof, encoded data constituting a single picture frame. A subsequent timestamp 15,000 is set in RTP packets (with sequence numbers of 7 to 12) containing encoded data constituting a subsequent picture frame, and packets to be retransmitted (with sequence numbers of 4 and 5) in response to a retransmission request by a NACK-RTCP packet from the receiver. In this manner, the data transmission terminal creates RTP packets using, for example, a common timestamp for each group of packets constituting a single picture frame.

Referring back to FIG. 4, description of processing at the data transmission terminal will be continued. The RTP packets created in step S201 are forwarded onto an IP network via an RTP-packet output port to a reception terminal in step S202. As described earlier with reference to FIG. 3, IP headers are assigned to the RTP packets, and the RTP packets are delivered to an address set in the IP headers. The packet creation process and packet transmission process in steps S201 and S202 are exited when an EOS (End Of Stream) message is transmitted to explicitly declare the end of the streaming data to be transmitted and time measured by a timer exceeds a preset time.

Step S203, in which it is determined whether a NACK-RTCP packet, which serves as a packet retransmission request, has been received, step S204, in which determined whether an ACK-RTCP packet, which serves as a positive acknowledgement of packet reception, has been received, and step S205, in which it is detected whether an ECHO-RTCP packet for measuring RTT has been received, shown in FIG. 4, are executed sequentially, as interrupt processing, in parallel to transmission of real data in RTP packets.

In step S203, it is determined whether a NACK-RTCP packet, which serves as a packet retransmission request from the data reception terminal, has been received. When a NACK-RTCP packet, which serves as a packet retransmission request from the data reception terminal, is received, steps S211 to S215 are executed. Steps S211 to S215 are executed by the ARQ processing unit 105 shown in FIG. 1.

Figure 6:
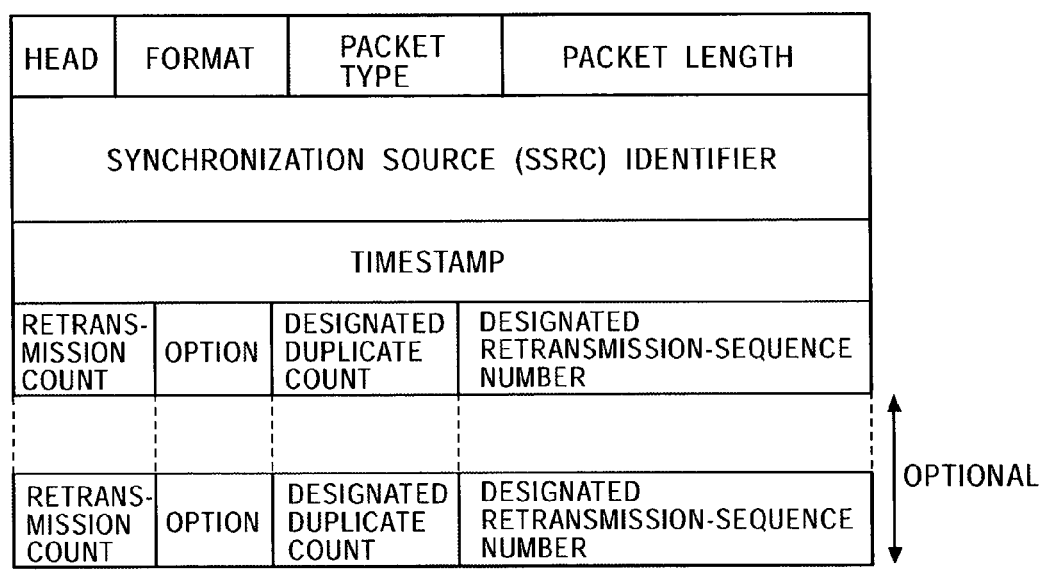
FIG. 6 is a diagram showing a format of a NACK-RTCP packet that is transferred in a data communication system according to an embodiment of the present invention.

In step S211, the data transmission terminal receives the NACK-RTCP packet. FIG. 6 shows a format of the NACK-RTCP packet, which serves as a packet retransmission request, created at the data reception terminal and received by the data transmission terminal.

As shown in FIG. 6, the NACK-RTCP packet includes information regarding header (HEAD), format, packet type, packet length, synchronization source (SSRC) identifier, and timestamp, and furthermore, setting of designated retransmission-sequence numbers, which serve as identifiers of packets to be retransmitted, and "retransmission count", "option", and "designated duplicate count" associated with each of the designated retransmission-sequence numbers is allowed.

As described earlier, in the system according to an embodiment of the present invention in which ARQ is used, various control packets based on RTCP are used, including a NACK packet, which serves as a retransmission request, an ACK packet, which serves as a positive acknowledgement of reception, an EOS packet explicitly declaring the end of streaming data, an ECHO packet and an ECHO-REPLY packet used for measuring an RTT between transmission and reception. It is not general to distinguish these format types of RTCP packets by the payload type (PT) fields of RTCP headers. Thus, the PT of each of these control messages is specified as a feedback message (FM), and feedback message types (FMT) are specified in the format fields of the RTCP headers to define types of the feedback messages.

As shown in FIG. 6, a single NACK packet is allowed to include one or more sequence numbers, which serve as identifiers of one or more packets to be retransmitted. That is, it is possible to request retransmission of a number of packets by transmitting a single NACK packet. The "retransmission count" field, associated with each of the sequence numbers in the retransmission request packet, specifies the count of retransmission requests, the "designated duplicate count" field specifies the count of duplicates for retransmission, and the "option" field is used to specify other information as needed.

For example, if "3" is set in the "designated duplicate count", the sender having received the NACK continuously transmits three retransmission packets containing the same data. If a certain packet contains important data, the reliability of reception of a corresponding retransmission packet can be enhanced by requesting duplicate retransmission. Also, if reception does not succeed even though NACK packets, which serve as retransmission requests for a particular packet, have been transmitted, or in a NACK packet transmitted at a time limit of retransmission for the data to be in time for real-time playing, the reliability of reception of a retransmission packet can be enhanced by increasing the value of the "designated duplicate count", serving to improve the quality of the data played. The receiver transmits NACK-RTCP packets as described above, and the sender retransmits packets based on the NACK-RTCP packets received.

If a priority is assigned to a packet, for example, by the RTP packet format or payload format, or intentionally by a user of the reception terminal, the reliability of reception of a corresponding retransmission packet can be enhanced by retransmitting the packet or data with high priority in duplicate. Furthermore, by specifying a count of retransmission requests in the "retransmission count." field, the sender is allowed to detect a loss of the NACK packet itself.

The "option" field allows setting of a processing parameter according to the value of the field, for example, as shown in FIG. 7. More specifically:

Option value=0: Request retransmission of packet(s) with designated sequence number(s) (default).

Option value=1: Request block retransmission of packets from the beginning of the frame to a designated sequence number.

Option value=2: Request block retransmission of packets from a designated sequence number to the end of the frame.

Option value=3: Request block retransmission of packets with a designated timestamp.

Option value=4: Request retransmission of packets determined on the basis of sequence numbers only regardless of timestamps.

As described earlier with reference to FIG. 2, encoded data of video data or the like is contained in RTP packets each having a header including a set of timestamp and sequence number. When a burst error ranging across one or more boundaries of timestamps occurs, or if packets are lost by units of frame due to a burst error, it is possible that the reception terminal is unable to identify a set of timestamp and sequence number associated with a lost packet. In such a case, either a timestamp or a sequence number that can be identified is set in the option field. Thus, one or more packets to be retransmitted can be designated flexibly.

As described above, the data reception terminal is allowed to designate packets to be retransmitted in various modes. The ARQ processing unit 105 of the data transmission terminal, having received the NACK-RTCP packet, extracts designated packets from the buffer 103 according to the values set in the options field, and the designated packets are retransmitted.

Referring back to FIG. 4, description of processing at the data transmission terminal will be continued. In step S212, sequence numbers associated with packets to be retransmitted as designated in the NACK-RTCP packet received in step S211 are extracted. In step S213, the option parameter is extracted. As described earlier, packets to be retransmitted can be designated not only directly by sequence numbers but also in various modes, for example, by a timestamp. The ARQ processing unit 105 of the data transmission terminal identifies packets to be retransmitted based on the option parameter, timestamp, and sequence numbers designated in the NACK-RTCP packet received.

In step S214, the packets identified for retransmission are extracted from the buffer 103. In the buffer 103, packets that have been transmitted are accumulated for a predetermined time in preparation for a retransmission request, and packets designated for retransmission are extracted from the buffer 103. In step S215, the packets extracted are transmitted from the RTP packet output port.

If it is determined in step S203 that a NACK-RTCP packet has not been received, then in step S204, it is determined whether an ACK-RTCP packet, which serves as a positive acknowledgement of packet reception, has been received. If an ACK-RTCP packet has been received, in step S208, packets whose reception has been acknowledged are cleared (deleted) from the buffer 103. The ACK packet allows the buffer 103 at the sender, holding packets in preparation for retransmission requests, to actively clear the buffer 103 as soon as possible, thereby serving to reduce the risk of buffer overflow.

Figure 8:
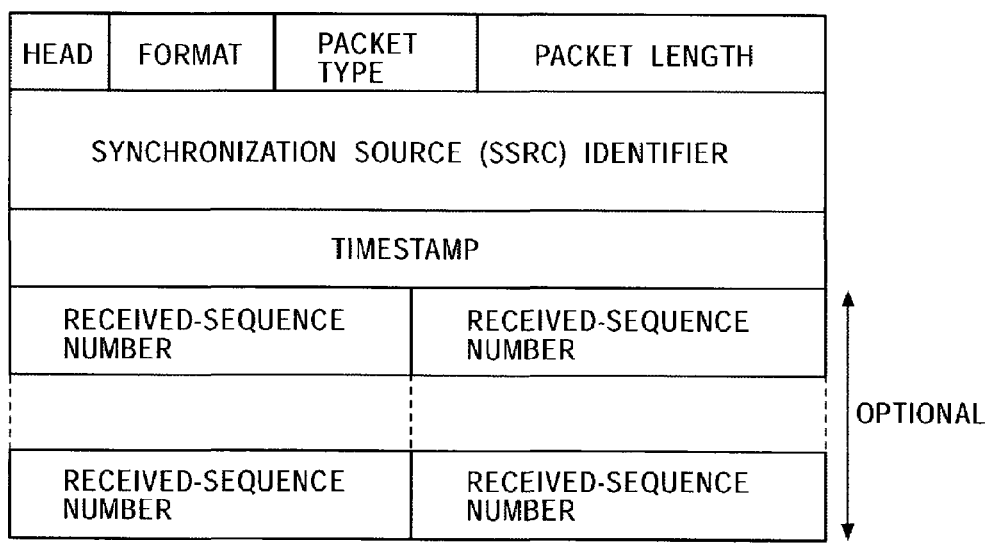
FIG. 8 is a diagram showing a format of an ACK-RTCP packet that is transferred in a data communication system according to an embodiment of the present invention.

FIG. 8 shows a format of the ACK-RTCP packet, which serves as a positive acknowledgement of packet reception, created at the data reception terminal and received at the data transmission terminal. As shown in FIG. 8, the ACK-RTCP packet includes fields of header (HEAD), format, packet type, packet length, synchronization source (SSRC) identifier, timestamp, and received-sequence numbers, which serve as identifiers of received packets.

It is also possible to designate only a timestamp without designating sequence numbers, which indicates that all the packets with the particular timestamp have been received. In this case, it is not necessary to designate all the sequence numbers, so that the size of the ACK-RTCP packet can be reduced, thereby serving to alleviate an increase of network traffic.

Referring back to FIG. 4, description of processing at the data transmission terminal will be continued. In step S205, the data transmission terminal determines whether an ECHO-RTCP packet has been received. If an ECHO-RTCP packet has been received from the data reception terminal, in step S209, the data transmission terminal transmits an ECHO-REPLY-RTCP packet to the data reception terminal that has transmitted the ECHO-RTCP packet.

The ECHO-RTCP packet and ECHO-REPLY-RTCP packet are used to allow the data reception terminal to grasp an RTT between the transmission terminal and the reception terminal. The exchange of these packets allows the data reception terminal to grasp the time taken from when the retransmission request is issued to when the retransmission packet is received at the data reception terminal. Accordingly, the data reception terminal is allowed to determine a time limit of retransmission request for the data to be played in real time.

In the system according to an embodiment of the present invention, the ARQ determination unit of the reception terminal determines whether a time limit for retransmission request based on the RTT has been reached, and thereby determines whether or not to transmit a NACK-RTCP packet, which serves as a retransmission request. In order to obtain the latest information regarding the RTT between the transmission terminal and the reception terminal, required for the determination process, the data reception terminal actively transmits an ECHO-RTCP packet to the data transmission terminal at a certain timing, and the data transmission terminal transmits an ECHO-REPLY-RTCP packet to the data reception terminal at the source of the ECHO-RTCP packet in response to the ECHO-RTCP packet.

The data reception terminal analyzes the ECHO-REPLY-RTCP packet received as a response from the data transmission terminal, thereby calculating the RTT between the transmission terminal and the reception terminal. The calculation of the RTT will be described later in relation to processing at the data reception terminal.

FIG. 9A shows a format of the ECHO-RTCP packet created at the data reception terminal and received at the data transmission terminal, and FIG. 9B shows a format of the ECHO-REPLY-RTCP packet created at the data transmission terminal and transmitted to the data reception terminal.

As shown in FIG. 9A, the ECHO-RTCP packet includes fields of header (HEAD), format, packet type, packet length, synchronization source (SSRC) identifier, and ECHO-ID, which serves as an identifier of the ECHO packet. As shown in FIG. 9B, the ECHO-REPLY-RTCP packet includes fields of header (HEAD), format, packet type, packet length, synchronization source (SSRC) identifier, ECHO-ID associated with the ECHO-RTCP packet, and server processing time.

Since both the ECHO-RTCP packet and the ECHO-REPLY-RTCP packet include the ECHO-ID, the data reception terminal is allowed to identify to which ECHO-RTCP packet a received ECHO-REPLY packet is associated with. The server processing time included in the ECHO-REPLY-RTCP packet corresponds to a time taken from when the data transmission terminal receives the retransmission request (NACK-RTCP) from the data reception terminal to when the retransmission packet is output from the data transmission terminal. The server processing time may be set, for example, in terms of a time taken from when the ECHO-RTCP packet is received to when the ECHO-REPLY-RTCP packet is transmitted. Alternatively, an actual time taken from when the data transmission terminal receives the retransmission request (NACK-RTCP) from the data reception terminal to when the retransmission packet is output from the data transmission terminal may be stored in a memory as history data at the data transmission terminal and used as the server processing time. In another alternative embodiment, a processing load on the server (data transmission terminal) at the time when the ECHO-RTCP packet is received may be calculated and a predicted processing time calculated from the processing load may be set as the server processing time.

The data reception terminal calculates the RTT between the transmission terminal and the reception terminal based on the server processing time included in the ECHO-REPLY-RTCP packet and the time between transmission of the ECHO-RTCP packet and reception of the ECHO-REPLY-RTCP packet. The calculation of the RTT will be described later in relation to processing at the data reception terminal.

Referring back to FIG. 4, description of processing at the data transmission terminal will be continued. In step S206, the data transmission terminal determines whether all the packets of streaming data to be transmitted have been transmitted. If the transmission has been completed, in step S210, the data transmission terminal transmits an RTCP packet containing an EOS (End Of Stream) message explicitly declaring the end of the data stream to the reception terminal.

FIG. 10 shows a format of the EOS-RTCP packet created at the data transmission terminal and received at the data reception terminal. As shown in FIG. 10, the EOS-RTCP packet includes fields of header (HEAD), format, packet type, packet length, synchronization source (SSRC) identifier, and timestamp. The data reception terminal recognizes the end of the streaming data upon receiving the EOS-RTCP packet from the data transmission terminal. Thus, the reception terminal is prevented from transmitting a NACK packet erroneously because of non-arrival of a next frame.

Referring back to FIG. 4, description of processing at the data transmission terminal will be continued. In step S207, the data transmission terminal determines whether a time measured by a timer has exceeded a preset time. If the time has not exceeded the preset time, the data transmission terminal continues the process of step S203, that is, determination as to whether a NACK-RTCP packet, which serves as a packet retransmission request, has been received, and subsequent processes. This is because a NACK-RTCP packet, which serves as a packet retransmission request, an ACK-RTCP packet, which serves as a positive acknowledgement of reception, or an ECHO-RTCP packet may be received during a certain period even after all the packets have been transmitted, in which case the received packet must be processed. When the timer exceeds the preset time, the transmission of the data is completed.

Processing at Data Reception Terminal

Figure 11:
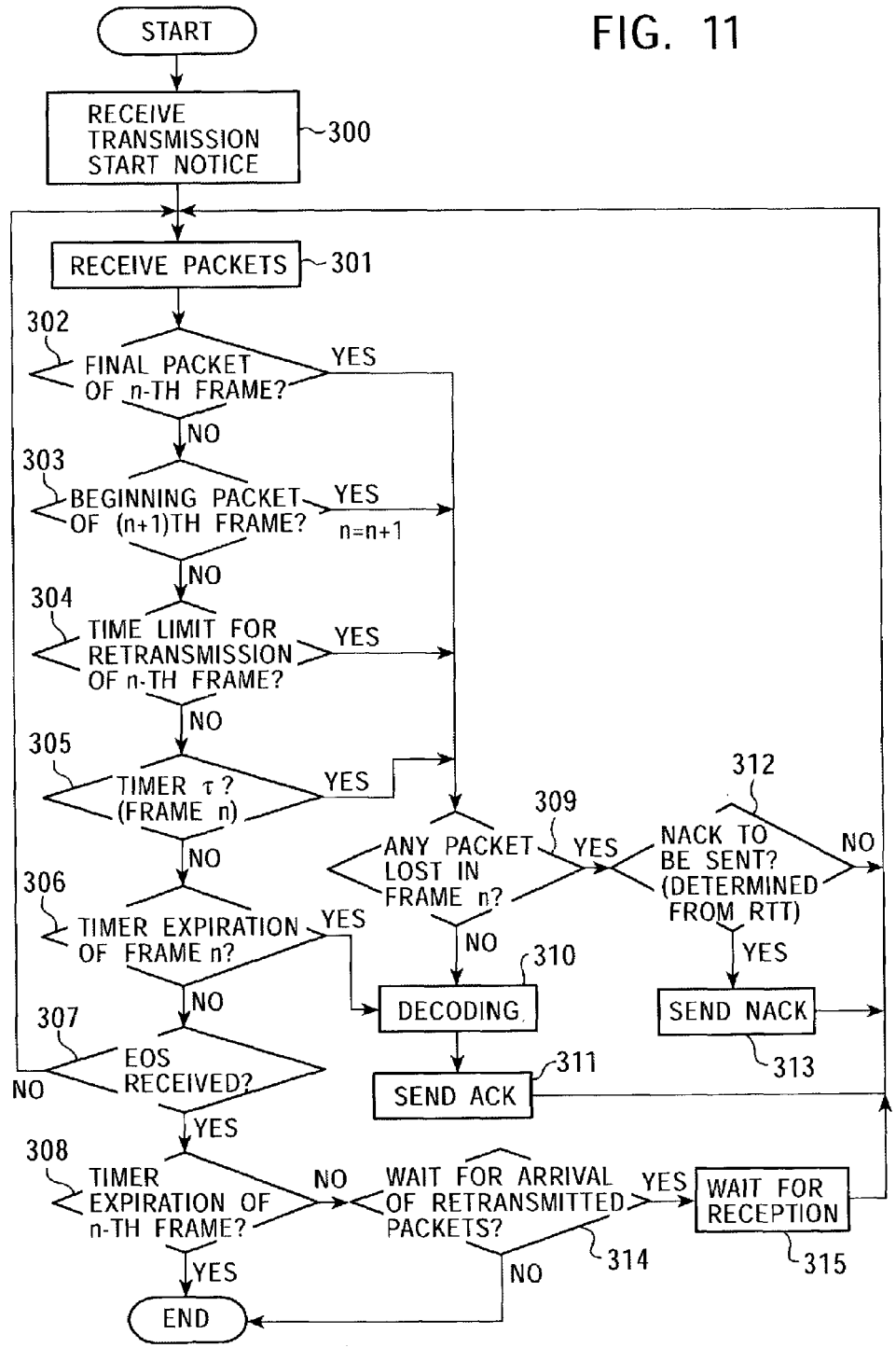
FIG. 11 is a flowchart showing a procedure of processes executed at a data reception terminal of a data communication system according to an embodiment of the present invention.

A processing procedure at the data reception terminal will be described with reference to a flowchart shown in FIG. 11. FIG. 11 is a flowchart of processes executed at the receiver terminal 121 shown in FIG. 1.

In step S300, the data reception terminal receives a notice of start of transmission from the data transmission terminal. In step S301, the data reception terminal sequentially receives transmission packets, that is, RTP packets containing encoded data as payloads thereof, from the data transmission terminal. As described earlier with reference to FIG. 2, the RTP packets include timestamps in header information thereof. The data reception terminal is allowed to distinguish frames associated with the received packets based on the timestamps. As described earlier, when motion picture data is transmitted as the encoded data in the RTP packets, a common timestamp is set to a number of RTP packets belonging to a single picture frame, and the data reception terminal is allowed to distinguish frames with reference to the timestamp.

In step S302, the data reception terminal determines whether a received packet is the final packet of an n-th frame (n=1, 2, . . . ). Furthermore, in step S303, the data reception terminal determines whether the received packet is the beginning packet of an (n+1)th frame. If the received packet is the final packet of the n-th frame (n=1, 2, . . . ) or the beginning packet of the (n+1)th frame, the data reception terminal proceeds to step S309.

In step S309, the data reception terminal determines whether any unreceived packet, that is, any lost packet, or any error packet exists in the frame n. A process of detecting an error packet or a lost packet in step S309 will be described with reference to FIG. 5.

Figure 5:
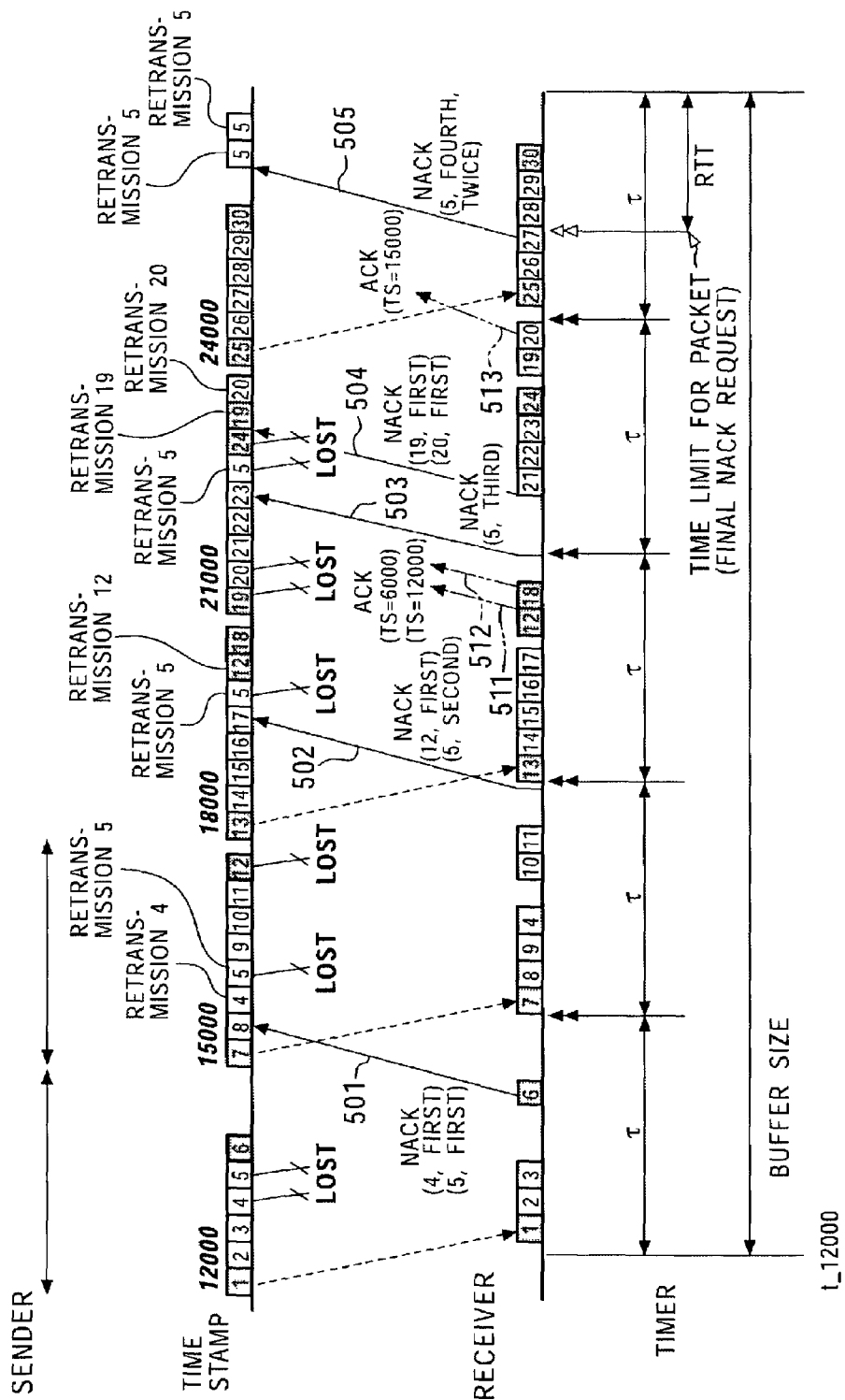
FIG. 5 is a time sequence chart of a data communication process carried out between a data transmission terminal and a data reception terminal of a data communication system according to an embodiment of the present invention.

FIG. 5 is an example in which RTP and RTCP packets are being transferred between the sender and the receiver. In FIG. 5, it is assumed that time is proceeding to the right as viewed in the figure. It is assumed herein that the clock rate is 90 kHz, and motion picture data sampled at 30 fps (frames/second) is encoded and contained in RTP packets for transmission. In this case, the timestamp of the RTP packets is unchanged within the same picture frame, and is counted up by increments of 90K/30=3,000. The receiver implements a minimum-increment timer τ. In this example, it is assumed that the encoded video data is compressed based on MOTION JPEG 2000 to yield encoded data, and the final packet of each frame can be detected by the packet analyzing unit 114 of the data reception terminal.

Referring to FIG. 5, a timestamp 12,000 is set to packets with sequence numbers of 1 to 6, and these packets belong to a single frame, for example, the frame n. When the data reception terminal receives the packet with the sequence number of 6, step S302 evaluates to yes, and the lost-packet detection process of step S309 is executed. At this time, the data reception terminal has received packets with sequence numbers of 1 to 3 and 6, and thus determines that packets with sequence numbers of 4 and 5 have been lost. Although the above description only deals with lost packets, also when error packets have been detected, a process similar to the case of lost packets is executed, that is, a retransmission request is issued.

If a lost packet or an error packet is detected, the data reception terminal proceeds to step S312 and subsequent processes, in which the data reception terminal determines whether or not to transmit a NACK-RTCP packet, which serves as a retransmission request, and transmits a NACK-RTCP packet accordingly. These processes will be described later in detail. It is assumed herein that a NACK-RTCP packet for the lost packets with sequence numbers of 4 and 5 is created, and the NACK-RTCP packet with designated retransmission-sequence numbers of 4 and 5, described earlier with reference to FIG. 6, is transmitted to the data transmission terminal as a retransmission-request packet. This process corresponds to a NACK-RTCP packet transmission process 501 in FIG. 5.

If a combination of timestamp and sequence number cannot be identified when a NACK-RTCP packet is to be transmitted, an option described earlier with reference to FIG. 7 is designated. The data reception terminal records information regarding transmission and reception of packets as required so that a packet loss rate can be calculated. If the loss rate becomes greater than or equal to a predetermined value, it is presumed that the NACK-RTCP packet itself might have been lost. Thus, the same NACK-RTCP packet is transmitted several times in repetition so that retransmission will be more likely to succeed. Alternatively, the designated duplicate count in the NACK-RTCP packet is increased.

The data transmission terminal, upon receiving the NACK-RTCP packet, transmits retransmission packets together with frame data with a next timestamp. In this case, retransmission packets with sequence numbers of 4 and 5 are transmitted together with frame data with sequence numbers of 7 to 12 and with a timestamp of 15,000. The timing of retransmission is not necessarily synchronized with transmission of the next frame data, and may be synchronized with the subsequent or later frame data depending on the timing of processing. The data reception terminal is allowed to estimate the timing of retransmission by transmitting an ECHO-RTCP packet and receiving an ECHO-REPLY RTCP packet and thereby calculating an RTT between the transmission terminal and the reception terminal. This process will be described later.

If the final packet or the beginning packet of each of the frames with timestamps of 12,000 to 24,000 in FIG. 5 is received, step S302 or step S303 in FIG. 11 evaluates to yes, and the data reception terminal executes the lost-packet detection process of step S309. The data reception terminal then proceeds to step S312 and subsequent processes, in which it is determined whether to transmit a NACK-RTCP packet, which serves as a retransmission request, and a NACK-RTCP packet is transmitted accordingly.

The process in step S312 of determining whether to transmit a NACK-RTCP packet, which serves as a retransmission request, will be described. In order to allow real-time playing, a requested retransmission packet must reach the reception terminal in time for playing. The process in step S312 of determining whether to transmit a NACK-RTCP packet, which serves as a retransmission request, determines whether a retransmission packet can be received in time for real-time playing if a NACK-RTCP packet is transmitted.

For the purpose of this determination, the RTT between the transmission terminal and the reception terminal is an essential parameter, as described earlier. If the RTT is large, even if a retransmission request is issued from the data reception terminal to the data transmission terminal, it takes time between the issuance of the retransmission request to reception of a retransmission packet transmitted from the data transmission terminal to the data reception terminal, and the retransmission packet might not be passed in time to the decoder for decoding and real-time playing. In the system according to an embodiment of the present invention, the data reception terminal grasps the RTT in advance, and determines whether to transmit a NACK-RTCP packet based on the RTT.

In the system according to an embodiment of the present invention, the data reception terminal is allowed to measure the RTT at an arbitrary timing. More specifically, the data reception terminal transmits an ECHO-RTCP packet described earlier with reference to FIG. 9A, and receives an ECHO-REPLY-RTCP packet described earlier with reference to FIG. 9B, thereby calculating the RTT.

Figure 12A:
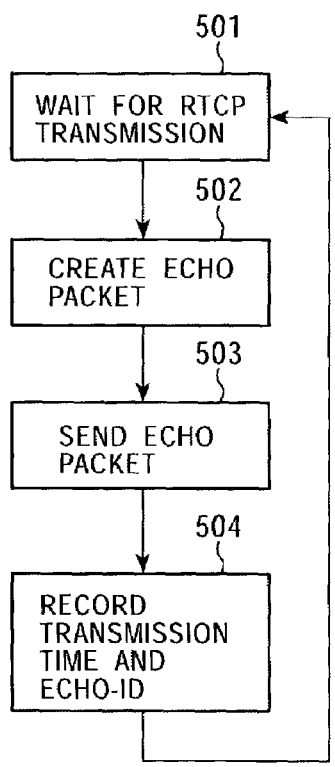
FIGS. 12A and 12B are flowcharts showing procedures of processes for measuring a round-trip time, executed at a data reception terminal, using ECHO-RTCP and ECHO-REPLY-RTCP packets according to an embodiment of the present invention.

The transmission of an ECHO-RTCP packet, reception of an ECHO-REPLY-RTCP packet, and calculation of the RTT, executed by the data reception terminal, will be described with reference to FIGS. 12A and 12B. FIG. 12A is a flowchart showing the process of transmitting an ECHO-RTCP packet. The data reception terminal is allowed to transmit an ECHO-RTCP packet actively at an arbitrary timing.

If a request for measuring the RTT is issued while waiting for transmission of an RTCP packet in step S501, the data reception terminal enters a process of creating an ECHO-RTCP packet in step S502. Setting for measuring the RTT may be such, for example, that the RTT is measured at a regular interval after reception of a notice of start of transmission in step S300 in the processing flow shown in FIG. 11. More specifically, whether a predetermined measurement interval has passed is measured by a timer at the data reception terminal, and if the predetermined measuring interval has passed, the ARQ determination unit 119 outputs a request for creating an ECHO-RTCP packet to the packet creating unit 116, and the packet creating unit 116 executes creates an ECHO-RTCP packet in step S502. Alternatively, an ECHO-RTCP packet may be created and transmitted according to status of packet loss. In any case, the data reception terminal is allowed to create and transmit an ECHO-RTCP packet at an arbitrary timing, and is thus constantly allowed to calculate the latest RTT.

The ECHO-RTCP packet created in step S502 is configured as described earlier with reference to FIG. 9A. The ECO-RTCP packet includes an ECHO-ID, which serves as a unique identifier of the packet. In step S503, the ECHO-RTCP packet is transmitted to the sender terminal 104 via the RTCP input/output port 113. In step S504, the time of transmission of the ECHO-RTCP packet and the ECHO-ID in the packet are recorded in a memory.

Figure 12B:
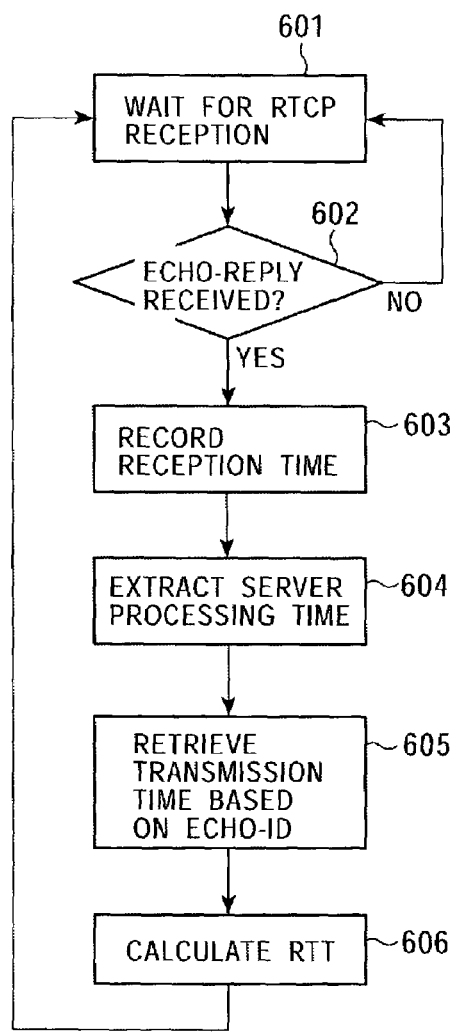

FIG. 12B is a flowchart of reception of an ECHO-REPLY-RTCP packet and calculation of the RTT. While waiting for transmission of an RTCP packet in step S601, if it is determined that an ECHO-REPLY-RTCP packet has been received (yes in step S602), the time of reception of the ECHO-REPLY-RTCP packet is recorded in a memory in step S603. The ECHO-REPLY-RTCP packet is configured as described earlier with reference to FIG. 9B. The ECHO-REPLY-RTCP packet includes the same ECHO-ID as the associated ECHO-RTCP packet, and also includes a server processing time calculated at the data transmission terminal.

In step S604, the server processing time is extracted from the received ECHO-REPLY-RTCP packet, and in step S605, a transmission time of the associated ECHO-RTCP packet is found on the basis of the ECHO-ID in the received ECHO-REPLY-RTCP packet.

In step S606, the RTT is calculated based on the reception time of the ECHO-REPLY-RTCP packet, obtained in step S603, the server processing time obtained in step S604, and the transmission time of the ECHO-RTCP packet, obtained in step S603. The RTT is calculated according to the following equation:

RTT=(reception time of ECHO-REPLY)−(transmission time of ECHO)−(server processing time)

It is also possible that an ECHO packet or an ECHO-REPLY packet transmitted or received for measuring the RTT is lost. Furthermore, the RTT constantly changes depending on network status. Thus, the data reception terminal transmits and receives an ECHO packet and an ECHO-REPLY packet at a regular interval to measure the RTT.

Referring back to the flowchart of FIG. 11, description of processing at the data reception terminal will be continued. Referring to the flowchart of FIG. 11, in step S312, it is determined whether a packet to be retransmitted can be received in time for real-time playing if a NACK-RTCP packet, which serves as a retransmission request, is transmitted. If it is determined, based on the RTT measured by the transmission of the ECHO packet and reception of the ECHO-REPLY packet described above and the time limit of the timer measuring timing for processing each frame, that the retransmission packet will not be in time even if a NACK-RTCP packet, which serves as a retransmission request, is transmitted (no in step S312), a NACK-RTCP packet is not transmitted.

For example, if the time Ta until start of processing of encoded data of a frame relevant to a lost packet is Ta=100 msec, that is, if it is known from timer measurement that data will be passed to the decoder and decoding will start in 100 msec, and if the latest measured RTT is larger than the time Ta until the start of the processing of the encoded data of the relevant frame, that is, if the latest RTT is larger than 100 msec, it is determined that retransmission packets will not be received in time for the start of decoding even if a NACK-RTCP packet, which serves as a retransmission request, is transmitted, and thus a NACK-RTCP packet is not transmitted. Even if the RTT is greater than or equal to the time Ta until the start of the processing, if the RTT and the time Ta are close to each other, a NACK packet may be transmitted since there is a possibility that the retransmission will be just in time. The threshold for determining whether to transmit a NACK packet is implementation-dependent.

If the measured latest RTT is smaller than the time Ta until the start of the processing of the encoded data of the frame relevant to the lost packet, since the time between transmission of a NACK-RTCP packet, which serves as a retransmission request, and reception of a retransmission packet will be within the time until the start of decoding, it is determined that the retransmission packet will be received in time, and thus a NACK-RTCP packet is transmitted in step S313.

The process of detecting lost packets in step S309 is executed not only when it is determined in step S302 that the final packet of a frame is received or when it is determined in step S303 that the beginning packet of a frame is received, but also when step S304 regarding the time limit for retransmission of a frame evaluates to yes or when step S305 regarding expiration of the minimum measurement time τ of the timer evaluates to yes.

The process of determination regarding the time limit for retransmission of a frame in step S304 and the process of determination regarding elapse of the minimum measurement time τ in step S305 will be described with reference to FIG. 5.

The process in step S304 of determination regarding the time limit of retransmission of a frame determines whether a retransmission packet will be in time for real-time playing if a NACK-RTCP packet, which serves as a retransmission request, is transmitted. Step S304 evaluates to yes when the time Ta until start of processing of encoded data of a frame becomes equal to a measured RTT, that is, when Ta=RTT, and the process of detecting lost packets in the relevant frame is executed in step S309. This process is executed so that a lost packet will be detected at a final timing within the time limit for retransmission and the final retransmission request will be transmitted if a lost packet is detected.

As shown in the lower right section of FIG. 5, when the time Ta until start of processing of packets with a timestamp of 12,000 becomes equal to the RTT, the determination in step S304 regarding the time limit for retransmission of the frame with the timestamp of 12,000 evaluates to yes, the process of detecting lost packets in the frame with the timestamp of 12,000 is executed in step S309, and if any lost packet is detected, the final retransmission request is transmitted in step S311. This process corresponds to a NACK-RTCP packet transmission process 505 in FIG. 5.

The determination in step S305 regarding elapse of the minimum measuring time τ of the timer evaluates to yes every period of the minimum measurement time τ of the timer of the data reception terminal, and the process of detecting lost packets of the relevant frame is executed in step S309. This process is executed in order to ensure that lost packets are reliably detected even if the beginning packet and the final packet of each reception frame corresponding to the minimum measurement time τ are not detected, and that a retransmission request is issued accordingly. This process corresponds to NACK-RTCP packet transmission processes 502 and 503 in FIG. 5.

In the NACK-RTCP packet transmission process 502 in FIG. 5, packets with sequence numbers of 5 and 12 are extracted as lost packets in packets constituting a frame having a timestamp that has already been received, a NACK-RTCP packet for the lost packets with the sequence numbers of 5 and 12 is created, in which 5 and 12 are set as designated retransmission-sequence numbers described earlier with reference to FIG. 6, and the NACK-RTCP packet is transmitted to the data transmission terminal as a retransmission request packet. Since the retransmission request with the sequence number 5 is transmitted for the second time, "2" is set in the "retransmission count" field associated with the sequence number of 5 in the NACK-RTCP packet.

In the NACK-RTCP packet transmission process 503 in FIG. 5, a packet with a sequence number of 5 is extracted as a lost packet in packets constituting a frame associated with a timestamp already received, and a NACK-RTCP packet for the lost packet with the sequence number of 5 is created and transmitted. Since the retransmission request associated with the sequence number of 5 is transmitted for the third time, "3" is set in the "retransmission count" field associated with the sequence number of 5 in the NACK-RTCP packet.

As described above, at the data reception terminal, the process of detecting lost packets in step S309 is executed when it is determined in step S302 that the final packet of a frame is received, when it is determined in step S303 that the beginning packet of a frame is received, and when it is determined in step S304 that the time limit for retransmission is reached, and when it is determined that the minimum measurement time τ of the timer has been reached. Alternatively, the process of step S309 may be executed at one of these four timings of steps S302 to S305.

If no lost packet is detected in the process of detecting lost packets in step S309, the decoder 120 decodes the encoded data contained in the received packets. In step S311, an ACK-RTCP packet, which serves as a positive acknowledgement of reception of received packets, is created and transmitted. As described earlier with reference to FIG. 8, the ACK-RTCP packet includes sequence numbers of packets that have been received. Upon receiving the ACK-RTCP packet, the data transmission terminal clears packets associated with the sequence numbers of received packets, included in the ACK-RTCP packet, from the buffer 103.

In the time sequence chart of FIG. 5, an ACK-RTCP packet for frame data with a timestamp of 15,000, is transmitted from the reception terminal to the transmission terminal in an ACK-RTCP packet transmission process 511, and an ACK-RTCP packet for frame data with a timestamp of 18,000 is transmitted in an ACK-RTCP packet transmission process 512, and an ACK-RTCP packet for frame data with a timestamp of 21,000 is transmitted in an ACK-RTCP packet transmission process 513.

In step S306 in the flowchart of FIG. 11, it is determined whether the timer has reached a time limit for a frame. The time limit is set for each frame by the timer for indicating a time limit for start of real-time playing. If it is determined that the timer has expired for a frame n, even if a lost packet is detected, the procedure proceeds to the decoding process of step S310.

In step S307, it is determined whether an RTCP packet containing an EOS (End of Stream) message explicitly declaring the end of the data stream has been received from the data transmission terminal. If an EOS-RTCP packet has not been received, step S301 and subsequent processes are repeated.

If an EOS-RTCP packet has been received, then in step S308, it is determined whether a time limit for a frame has been reached. The time limit is set for each frame by the timer for indicating a time limit for real-time playing. If the time limit has not been reached, the procedure proceeds to step S314, in which it is determined whether reception of a retransmission packet corresponding to a lost packet associated with a retransmission request is being waited for. If the reception is being waited for, the procedure proceeds to step S315, step S301 and subsequent processes are executed for reception of the retransmission packet.

If the determination in step S308 regarding the time limit of a frame evaluates to yes, or if it is determined in step S314 that reception of a retransmission packet is not being waited for, it is determined that no packet data yet to be received exists that is to be processed for playing, and thus the reception process completes.

As described above, in the system according to an embodiment of the present invention, the function of ARQ is provided for transmission of packets according to a data communication protocol that is suitable for real-time data distribution but that does not ensure reliability, such as RTP, allowing reliable data transmission with error resilience and real-time playing. Although the above embodiments have been described mainly in the context of RTP packets containing encoded data, without limitation to RTP packets, a retransmission request process similar to that in the above embodiments can be implemented using similar control packets even in data communication using packets based on other communication protocols, for example, UDP, allowing an implementation similar to the above embodiments.

Furthermore, according to an embodiment of the present invention, as described above, lost packets are detected and retransmission requests are issued at various timings, such as when the beginning packet of a frame is received, when the final packet of a frame is received, at a time limit for processing, and at a regular interval τ. Accordingly, lost packets are detected reliably.

Furthermore, since the data reception terminal issues retransmission requests with consideration of processing time for playing and RTT, the data reception terminal is prevented from transmitting useless retransmission request packets and retransmission packets, thereby avoiding reduction in network bandwidth by retransmission. Furthermore, the data reception terminal records information regarding transmission and reception of packets as required and calculates a packet loss rate. If the loss rate becomes greater than or equal to a predetermined value, the reliability of retransmission can be enhanced by transmitting the same NACK-RTCP packet several times in duplicate.

Furthermore, since setting of a designated duplicate count is allowed in a NACK-RTCP packet transmitted by the reception terminal, which serves as a retransmission request, duplicate retransmission of a packet to be retransmitted can be requested in accordance with network status and as desired by the receiver, thereby serving to improve the reliability of reception of important data. For example, by requesting duplicate transmission of a final retransmission packet for the data to be in time for playing, the data can be played in high quality.

Furthermore, since an ACK message regarding received packets is transmitted from the data reception terminal to the data transmission terminal, for example, by units of picture frame, or on a block-by-block basis, so that occupation of bandwidth due to transmission of ACK messages on a packet-by-packet basis is avoided. Furthermore, the sender is allowed to actively discard packets from a packet accumulating buffer for retransmission based on the ACK packets received from the receiver, thereby serving to prevent buffer overflow and buffer underflow.

Configuration of a Data Transmission/Reception Terminal

The series of processes in the embodiments described above may be executed by hardware or software, or a combination thereof. In order to execute the processes by software, a program defining the processing sequence may be installed in a memory of a data processing apparatus embedded in dedicated hardware, or the program may be installed on a general-purpose computer that is capable of executing various processes. When the series of processes are executed by software, the program constituting the software is installed on, for example, a general-purpose computer or a microcomputer.

Figure 13:
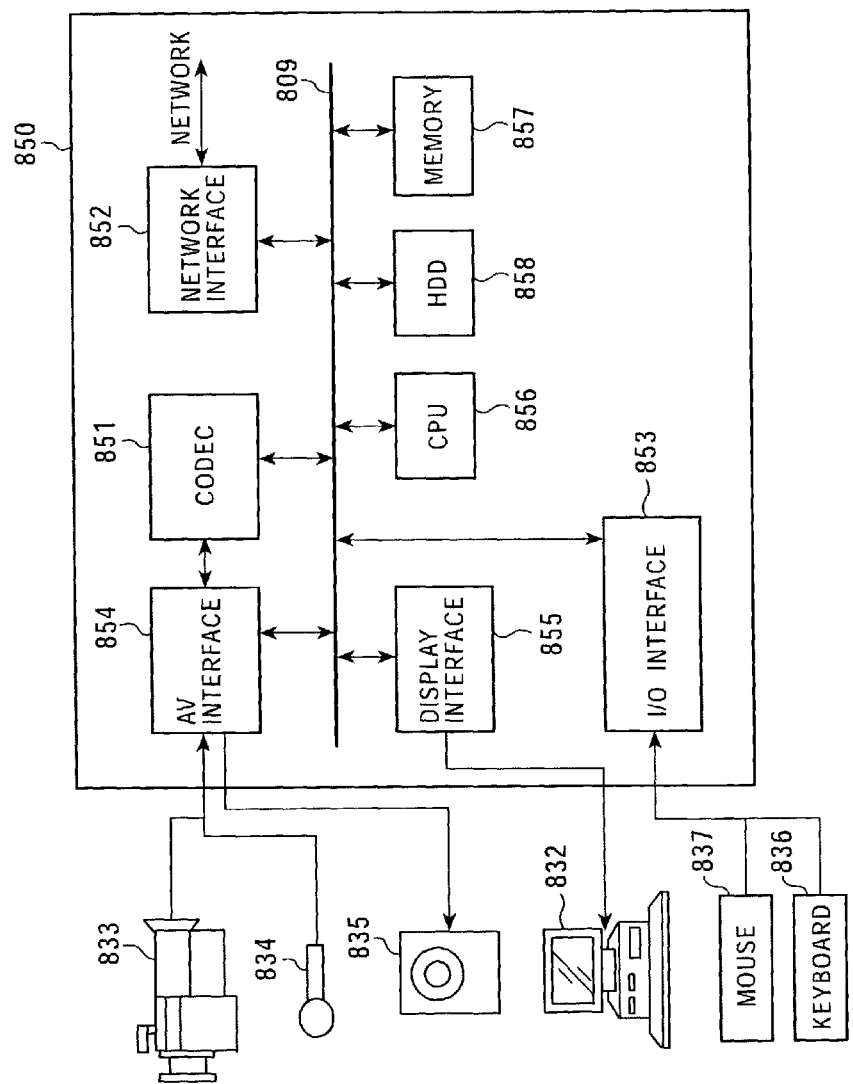
FIG. 13 is a diagram showing a system configuration of a data transmission apparatus and a data reception apparatus according to an embodiment of the present invention.

FIG. 13 shows one exemplary system configuration of a data transmission apparatus and a data reception apparatus for executing the series of processes in the embodiments described above. The data transmitted and received in the system according to an embodiment of the present invention is encoded data. The data transmission apparatus encodes data, and the data reception apparatus decodes the data. The encoded data is transmitted and received in packets via a network. The data transmission apparatus packetizes the data, and the data reception apparatus depacketizes the packets.

Referring to FIG. 13, a data transmission/reception apparatus (e.g., a personal computer) 850 includes a codec 851 for encoding and decoding data and also for packetization and depacketization, a network interface 852 that functions as an interface with a communication network, an input/output interface 853 with input devices such as a mouse 837 and a keyboard 836, an AV interface 854 for input/output of data to and from AV-data input/output apparatuses such as a video camera 833, a microphone 834, and a speaker 835, a display interface 855 that functions as a data output interface with a display 832, a CPU 856 for controlling transfer of data among the data input/output interfaces, the codec 851, and the network interface 852, and for executing various programs, a memory 857 including a ROM and a RAM for storing various programs executed by the CPU 856 and for storing data, and that functions as a work area for the CPU 856, and an HDD 858 that functions as a storage medium for storing data and programs. These components are connected to a PCI bus 859 so as to allow exchange of data among the components.

Referring to FIG. 13, the codec 851 receives, for example, video data from the video camera 833 and audio data from the microphone 834, and encodes and packetizes the data, thereby creating packets containing the encoded data as payloads thereof. The packets are transferred onto the PCI bus 859, output onto a network via the network interface 852, and then delivered to a destination address that is set in the headers of the packets.

The video data from the video camera 833 and the audio data from the microphone 834 may be encoded and output onto the network via the network interface 852 under the control of the CPU 856 according to a software encoding program stored in the HDD 858 or the memory 857.

Data in IP packets received via the network is transferred onto the bus 859 via the network interface 852, and then input to the codec 851. The codec 851 depacketizes the packets to extract encoded data contained in the packets as payloads thereof, and decodes the encoded data, whereby the data is output to and played by the display 832 and the speaker 835.

The video data or the like that is processed in the embodiments described above may be input from an input device such as a camera, a data input apparatus such as a scanner, or a removable recording medium such as a floppy disc, a CD-ROM (Compact Disc Read-Only Memory), an MO (Magneto-Optical) disc, a magnetic disc, a semiconductor memory, or the like.

Furthermore, without limitation to a program stored in the ROM, the CPU 856 may load a program stored in a hard disc, a program transferred via a satellite or a network and installed, for example, in a RAM (Random Access Memory) and execute the program.

A program referred to herein may be executed by a single computer or by a number of computers in a distributed manner. Furthermore, the program may be transferred to and executed by a remote computer.

As described hereinabove, according to an embodiment of the present invention, the function of ARQ is provided for transmission of packets according to a data communication protocol such as RTP or UDP. Lost packets are detected at various timings, for example, when the beginning packet of each frame is received, when the final packet of each frame is received, at a time limit of processing, and at a regular interval τ, and retransmission requests are issued as required. Accordingly, lost packets are detected reliably, thereby serving to achieve reliable data transmission with error resilience and allowing real-time playing.

Furthermore, according to an embodiment of the present invention, a data reception terminal does not transmit a retransmission request packet if a retransmission packet will not be in time for processing for playing including decoding with consideration of processing time and RTT. Accordingly, transmission of useless retransmission request packets and retransmission packets is avoided, thereby serving to avoid reduction in network bandwidth due to frequent retransmissions.

Furthermore, according to an embodiment of the present invention, by recording information regarding transmission and reception of packets at a data reception terminal as required so that a packet loss rate can be calculated, the reliability of retransmission can be improved by actively transmitting the same NACK packet in duplicate if the loss rate detected by the data reception terminal becomes greater than or equal to a predetermined value.

Furthermore, according to an embodiment of the present invention, setting of a designated duplicate count is allowed in a NACK packet, which serves as a retransmission request, transmitted by a reception terminal. Accordingly, duplicate retransmission of a packet to be retransmitted can be requested in accordance with network status and a request from the reception terminal, thereby allowing improvement in the reliability of reception of important data. In particular, if a final retransmission packet for the packet to be in time for playing is lost, incomplete data will be played. Thus, the reception terminal requests duplicate retransmission of the packet to improve the reliability of retransmission, thereby serving to improve the quality of data played.

Furthermore, according to an embodiment of the present invention, ACK messages for received packets are received from a data reception terminal on a frame-by-frame basis, block-by-block basis, or by units of a number of packets instead of on a packet-by-packet basis. Accordingly, occupation of bandwidth by ACK packets is avoided. Furthermore, a data transmission terminal is allowed to actively discard packets from a packet accumulation buffer for retransmission based on ACK packets received from a reception terminal, thereby serving to prevent buffer overflow and buffer underflow.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A data communication system for transferring streaming data, comprising:
a data transmission apparatus including a packet transmission processing unit for transmitting a plurality of data packets containing transmission data, and a retransmission control unit for extracting at least one data packet to be retransmitted according to a retransmission-request message packet received from a data reception apparatus, the data reception apparatus including a packet reception processing unit for receiving the plurality of data packets transmitted from said data transmission apparatus, and a retransmission-request processing control unit for determining whether to transmit a retransmission-request message packet that serves as a data-packet retransmission request to said data transmission apparatus, based on detection of at least one of a lost packet and an error in the plurality of data packets transmitted from said data transmission apparatus,
wherein said retransmission-request processing control unit determines whether one or more retransmission data packets associated with the retransmission request can be received in time for processing relating to playing of data contained in the one or more retransmission data packets, and determines whether to transmit the retransmission request on condition that the one or more retransmission data packets can be received in time, and
wherein the retransmission-request message packet includes at least one sequence number and an option field having one of a plurality of option values; each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

2. A data communication system according to claim 1, wherein the data contained in the plurality of data packets is encoded data, and said retransmission-request processing control unit of said data reception apparatus determines whether the one or more retransmission data packets associated with the retransmission request can be received in time for processing, including decoding, relating to playing of the data contained in the one or more retransmission data packets.

3. A data communication system according to claim 1, wherein the retransmission request is a message packet including one or more sequence numbers that serve as identification data of one or more data packets to be retransmitted, and also including data of a designated count of duplicate retransmission of the one or more data packets associated with the one or more sequence numbers, and said data transmission apparatus executes duplicate retransmission of the one or more data packets associated with the one or more sequence numbers in accordance with the data of the designated count of duplicate retransmission designated in the retransmission-request message packet.

4. A data communication system according to claim 1, wherein the plurality of data packets transferred between said data transmission apparatus and said data reception apparatus includes motion picture data, and said retransmission-request processing control unit of said data reception apparatus, upon receiving a final data packet in a plurality of data packets containing data constituting a single picture frame of the motion picture data, detects at least one of a lost data packet and an error in the plurality of data packets containing the data constituting the picture frame to which the final data packet belongs.

5. A data communication system according to claim 1, wherein the plurality of data packets transferred between said data transmission apparatus and said data reception apparatus includes motion picture data, and said retransmission-request processing control unit of said data reception apparatus, upon receiving a beginning data packet in a plurality of data packets containing data constituting a single picture frame of the motion picture data, detects at least one of a lost data packet and an error in a plurality of data packets containing data constituting a picture frame previous to the picture frame to which the beginning data packet belongs.

6. A data communication system according to claim 1, wherein said retransmission-request processing control unit of said data reception apparatus detects a lost data packet or an error in the received data packets on the basis of a time limit of a retransmission request for data contained in a data packet to be in time for processing relating to playing of the data.

7. A data communication system according to claim 1, wherein said retransmission-request processing control unit of said data reception apparatus detects at least one of a lost data packet and an error in the received data packets on the basis of a regular time interval.

8. A data communication system according to claim 1, wherein said retransmission-request processing control unit of said data reception apparatus controls transmission of an echo packet to said data transmission apparatus and reception of an echo-reply packet in response to the echo packet in order to measure a round-trip time between said data transmission apparatus and said data reception apparatus, and determines whether the one or more retransmission data packets associated with the retransmission request can be received in time for the processing relating to playing of the data contained in the one or more retransmission data packets, based on the round-trip time calculated based on the echo packet and the echo-reply packet.

9. A data communication system according to claim 1, wherein the retransmission-request message packet created by said data reception apparatus further includes at least one of sequence-number designation data designating one or more data packets and timestamp designation data designating a timestamp for one or more packets, and said retransmission control unit of said data transmission apparatus extracts one or more packets to be retransmitted based on at least one of the sequence-number designation data and the timestamp designation data, and the option value, included in the retransmission-request message packet received from said data reception apparatus.

10. A data communication system according to claim 1, wherein each of the plurality of data packets has a format according to a Real-Time Transport Protocol, which serves as a data transfer protocol, and the retransmission request has a format according to a Real-Time Transport Control Protocol, which serves as a control protocol.

11. A data communication system according to claim 1, wherein said data reception apparatus transmits a retransmission request for a plurality of data packets using a single retransmission-request message packet to said data transmission apparatus.

12. A data communication system according to claim 1, wherein said data reception apparatus transmits an acknowledgement of reception of a plurality of data packets using a single reception-acknowledgement message packet to said data transmission apparatus.

13. A data transmission apparatus for transmitting streaming data, comprising:
a packet transmission processing unit for transmitting a plurality of data packets containing transmission data; and
a retransmission control unit for extracting at least one data packet to be retransmitted according to a retransmission request received from a data reception apparatus, wherein said data transmission apparatus executes duplicate retransmission of at least one designated data packet in accordance with data of a designated count of duplicate retransmission designated in a retransmission-request message packet received from said data reception apparatus,
wherein said data reception apparatus determines whether one or more retransmission data packets associated with the retransmission request message packet can be received in time for processing relating to playing of data contained in the one or more retransmission data packets, and determines whether to transmit the retransmission request message packet on condition that the one or more retransmission data packets can be received in time, and
wherein the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

14. A data transmission apparatus for transmitting streaming data, comprising:
a packet transmission processing unit for transmitting a plurality of data packets containing transmission data; and
a retransmission control unit for extracting at least one data packet to be retransmitted according to a retransmission request received from a data reception apparatus, wherein said retransmission control unit extracts at least one packet to be retransmitted based on at least one of sequence-number designation data designating at least one data packet and timestamp designation data for at least one packet, included in a retransmission-request message packet received from said data reception apparatus,
wherein said data reception apparatus determines whether one or more retransmission data packets associated with the retransmission-request message packet can be received in time for processing relating to playing of data contained in the one or more retransmission data packets, and determines whether to transmit the retransmission-request message packet on condition that the one or more retransmission data packets can be received in time, and
wherein retransmission-request message packet further includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

15. A data reception apparatus for receiving streaming data, comprising:
a packet reception processing unit for receiving a plurality of data packets transmitted from a data transmission apparatus; and a retransmission-request processing control unit for determining whether to transmit a retransmission-request message packet that serves as a data-packet retransmission request to said data transmission apparatus, based on detection of at least one of a lost packet and an error in the plurality of data packets transmitted from said data transmission apparatus, wherein said retransmission-request processing control unit determines whether one or more retransmission data packets associated with the retransmission request can be received in time for processing relating to playing of data contained in the one or more retransmission data packets, and determines to transmit the retransmission request on condition that the one or more retransmission data packets can be received in time, and wherein the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

16. A data reception apparatus according to claim 15, wherein the data contained in the plurality of data packets is encoded data, and said retransmission-request processing control unit determines whether the one or more retransmission data packets associated with the retransmission request can be received in time for processing, including decoding, relating to playing of the data contained in the one or more retransmission data packets.

17. A data reception apparatus according to claim 15, wherein a message packet including one or more sequence numbers that serve as identification data of one or more data packets to be retransmitted, and also including data of a designated count of duplicate retransmission of the one or more data packets associated with the one or more sequence numbers is created and transmitted to said data transmission apparatus.

18. A data reception apparatus according to claim 15, wherein the plurality of data packets received by said data reception apparatus include motion picture data, and said retransmission-request processing control unit, upon receiving a final data packet in a plurality of data packets containing data constituting a single picture frame of the motion picture data, detects at least one of a lost data packet and an error in the plurality of data packets containing the data constituting the picture frame to which the final data packet belongs.

19. A data reception apparatus according to claim 15, wherein the plurality of data packets received by said data reception apparatus include motion picture data, and said retransmission-request processing control unit, upon receiving a beginning data packet in a plurality of data packets containing data constituting a single picture frame of the motion picture data, detects at least one of a lost data packet and an error in a plurality of data packets containing data constituting a picture frame previous to the picture frame to which the beginning data packet belongs.

20. A data reception apparatus according to claim 15, wherein said retransmission-request processing control unit detects at least one of a lost data packet and an error in the received data packets on the basis of a time limit of a retransmission request for data contained in a data packet to be in time for processing relating to playing of the data.

21. A data reception apparatus according to claim 15, wherein said retransmission-request processing control unit detects at least one of a lost data packet and an error in the received data packets on the basis of a regular time interval.

22. A data reception apparatus according to claim 15, wherein said retransmission-request processing control unit controls transmission of an echo packet to said data transmission apparatus and reception of an echo-reply packet in response to the echo packet in order to measure a round-trip time between said data transmission apparatus and said data reception apparatus, and determines whether the one or more retransmission data packets associated with the retransmission request can be received in time for the processing relating to playing of the data contained in the one or more retransmission data packets, based on the round-trip time calculated based on the echo packet and the echo-reply packet.

23. A data reception apparatus according to claim 15, wherein the retransmission-request message packet further includes at least one of sequence-number designation data designating one or more data packets and timestamp designation data designating a timestamp for one or more packets.

24. A data reception apparatus according to claim 15, wherein each of the plurality of data packets has a format according to a Real-Time Transport Protocol, which serves as a data transfer protocol, and the retransmission request has a format according to a Real-Time Transport Control Protocol, which serves as a control protocol.

25. A data reception apparatus according to claim 15, wherein a retransmission request for a plurality of data packets is transmitted to said data transmission apparatus using a single retransmission-request message packet.

26. A data reception apparatus according to claim 15, wherein an acknowledgement of reception of a plurality of data packets is transmitted to said data transmission apparatus using a single reception-acknowledgement message packet.

27. A computer readable storage medium storing a computer readable program for transferring streaming data between a data transmission apparatus and a data reception apparatus, the computer readable program comprising the steps of:

a packet transmission processing step of transmitting a plurality of data packets containing transmission data;

a retransmission control step of extracting at least one data packet to be retransmitted according to a retransmission-request message packet received from said data reception apparatus;

a packet reception processing step of receiving the plurality of data packets transmitted from said data transmission apparatus; and a retransmission-request processing control step of determining whether or not to transmit a retransmission-request message packet that serves as a data-packet retransmission request to said data transmission apparatus, based on detection of at least one of a lost packet and an error in the plurality of data packets transmitted from said data transmission apparatus, wherein it is determined in said retransmission-request processing control step whether one or more retransmission data packets associated with the retransmission request can be received in time for processing relating to playing of data contained in the one or more retransmission data packets, and it is determined that the retransmission request be transmitted on condition that the one or more retransmission data packets can be received in time, wherein the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

28. A computer readable storage medium according to claim 27, wherein the data contained in the plurality of data packets is encoded data, and said retransmission-request processing control step executed at said data reception apparatus includes a step of determining whether the one or more retransmission data packets associated with the retransmission request can be received in time for processing, including decoding, relating to playing of the data contained in the one or more retransmission data packets.

29. A computer readable storage medium according to claim 27, wherein the retransmission request is a message packet including one or more sequence numbers that serve as identification data of one or more data packets to be retransmitted, and also including data of a designated count of duplicate retransmission of the one or more data packets associated with the one or more sequence numbers, and said data transmission apparatus executes duplicate retransmission of the one or more data packets associated with the one or more sequence numbers in accordance with the data of the designated count of duplicate retransmission designated in the retransmission-request message packet.

30. A computer readable storage medium according to claim 27, wherein the plurality of data packets transferred between said data transmission apparatus arid said data reception apparatus includes motion picture data, and said retransmission-request processing control step executed at said data reception apparatus includes a step of detecting, upon receiving a final data packet in a plurality of data packets containing data constituting a single picture frame of the motion picture data, a lost data packet or an error in the plurality of data packets containing the data constituting the picture frame to which the final data packet belongs.

31. A computer readable storage medium according to claim 27, wherein the plurality of data packets transferred between said data transmission apparatus and said data reception apparatus includes motion picture data, and said retransmission-request processing control step executed at said data reception apparatus includes a step of detecting, upon receiving a beginning data packet in a plurality of data packets containing data constituting a single picture frame of the motion picture data, a lost data packet or an error in a plurality of data packets containing data constituting a picture frame previous to the picture frame to which the beginning data packet belongs.

32. A computer readable storage medium according to claim 27, wherein said retransmission-request processing control step executed at said data reception apparatus includes a step of detecting at least one of a lost data packet and an error in the received data packets on the basis of a time limit of a retransmission request for data contained in a data packet to be in time for processing relating to playing of the data.

33. A computer readable storage medium according to claim 27, wherein said retransmission-request processing control step executed at said data reception apparatus includes a step of detecting at least one of a lost data packet and an error in the received data packets on the basis of a regular time interval.

34. A computer readable storage medium according to claim 27, further comprising the step of controlling transmission of an echo packet to said data transmission apparatus and reception of an echo-reply packet in response to the echo packet in order to measure a round-trip time between said data transmission apparatus and said data reception apparatus, and said retransmission-request processing control step includes a step of determining whether the one or more retransmission data packets associated with the retransmission request can be received in time for the processing relating to playing of the data contained in the one or more retransmission data packets, based on the round-trip time calculated based on the echo packet and the echo-reply packet.

35. A computer readable storage medium according to claim 27, wherein the retransmission-request message packet created by said data reception apparatus includes at least one of sequence-number designation data designating one or more data packets and timestamp designation data designating a timestamp for one or more packets, and also includes an option value designating a range of the retransmission request, and in said retransmission control step executed at said data transmission apparatus, one or more packets to be retransmitted are extracted based on at least one of the sequence-number designation data and the timestamp designation data, and the option value, included in the retransmission-request message packet received from said data reception apparatus.

36. A computer readable storage medium according to claim 27, wherein each of the plurality of data packets has a format according to a Real-Time Transport Protocol, which serves as a data transfer protocol, and the retransmission request has a format according to a Real-Time Transport Control Protocol, which serves as a control protocol.

37. A computer readable storage medium according to claim 27, further comprising the step of transmitting a retransmission request for a plurality of data packets to said data transmission apparatus using a single retransmission-request message packet.

38. A computer readable storage medium according to claim 27, further comprising the step of transmitting an acknowledgement of reception of a plurality of data packets to said data transmission apparatus using a single reception-acknowledgement message packet.

39. A computer readable storage medium storing a computer readable program for receiving streaming data, said computer readable program comprising the steps of:
 a packet reception processing step of receiving a plurality of data packets transmitted from a data transmission apparatus; and
 a retransmission-request processing control step of determining whether to transmit a retransmission-request message packet that serves as a data-packet retransmission request to said data transmission apparatus, based on detection of at least one of a lost packet and an error in the plurality of data packets transmitted from said data transmission apparatus, wherein said retransmission-request processing control step includes a step of determining whether one or more retransmission data packets associated with the retransmission request can be received in time for processing relating to playing of data contained in the one or more retransmission data packets, and determining that the retransmission request be transmitted on condition that the one or more retransmission data packets can be received in time, and wherein the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

40. A data communication system for transferring streaming data, comprising:

a data transmission apparatus including a packet transmission processing unit for transmitting a plurality of data packets containing transmission data, and a retransmission control unit for extracting at least one data packet to be retransmitted according to a retransmission-request message packet received from said data reception apparatus; and a data reception apparatus including a packet reception processing unit for receiving the plurality of data packets transmitted from said data transmission apparatus, and a retransmission-request processing control unit for determining whether to transmit a retransmission-request message packet that serves as a data-packet retransmission request to said data transmission apparatus, based on detection of at least one of a lost packet and an error in the plurality of data packets transmitted from said data transmission apparatus, wherein said retransmission-request processing control unit detects at least one of a lost data packet and an error in the received data packets on the basis of a regular time interval, determines whether one or more retransmission data packets associated with the retransmission request can be received in time for processing relating to playing of data contained in the one or more retransmission data packets, and determines whether to transmit the retransmission request on condition that the one or more retransmission data packets can be received in time, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

41. A data transmission apparatus for transmitting streaming data, comprising:

a packet transmission processing unit for transmitting a plurality of data packets containing transmission data; and a retransmission control unit for extracting at least one data packet to be retransmitted according to a retransmission request received from a data reception apparatus, wherein said data transmission apparatus executes duplicate retransmission of at least one designated data packet in accordance with data of a designated count of duplicate retransmission designated in a retransmission-request message packet received from said data reception apparatus, wherein said data reception apparatus determines whether one or more retransmission data packets associated with the retransmission-request message packet can be received in time for processing relating to playing of data contained in the one or more retransmission data packets, and determines whether to transmit the retransmission-request message packet on condition that the one or more retransmission data packets can be received in time, and wherein the retransmission control unit detects at least one of a lost data packet and an error in the received data packets on the basis of a regular time interval, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

42. A data transmission apparatus for transmitting streaming data, comprising:

a packet transmission processing unit for transmitting a plurality of data packets containing transmission data; and a retransmission control unit for extracting at least one data packet to be retransmitted according to a retransmission request received from a data reception apparatus, wherein said retransmission control unit extracts at least one packet to be retransmitted based on at least one of sequence-number designation data designating at least one data packet and timestamp designation data for at least one packet, and an option value, included in a retransmission-request message packet received from said data reception apparatus, wherein said data reception apparatus determines whether one or more retransmission data packets associated with the retransmission-request message packet can be received in time for processing relating to playing of data contained in the one or more retransmission data packets, and determines whether to transmit the retransmission-request message packet on condition that the one or more retransmission data packets can be received in time, and wherein the retransmission control unit detects at least one of a lost data packet and an error in the received data packets on the basis of a regular time interval, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

43. A data reception apparatus for receiving streaming data, comprising:

a packet reception processing unit for receiving a plurality of data packets transmitted from a data transmission apparatus; and a retransmission-request processing control unit for determining whether to transmit a retransmission-request message packet that serves as a data-packet retransmission request to said data transmission apparatus, based on detection on a regular time interval of at least one of a lost packet and an error in the plurality of data packets transmitted from said data transmission apparatus, wherein said retransmission-request processing control unit determines whether one or more retransmission data packets associated with the retransmission request can be received in time for processing relating to playing of data contained in the one or more retransmission data packets, and determines to transmit the retransmission request on condition that the one or more retransmission data packets can be received in time, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

44. A computer readable storage medium storing a computer readable program for transferring streaming data between a data transmission apparatus and a data reception apparatus, the computer readable program comprising the steps of:

a packet transmission processing step of transmitting a plurality of data packets containing transmission data;

a retransmission control step of extracting at least one data packet to be retransmitted according to a retransmission-request message packet received from said data reception apparatus;

a packet reception processing step of receiving the plurality of data packets transmitted from said data transmission apparatus; and a retransmission-request processing control step of determining whether or not to transmit a retransmission-request message packet that serves as a data-packet retransmission request to said data transmission apparatus, based on detection on a regular time interval of at least one of a lost packet and an error in the plurality of data packets transmitted from said data transmission apparatus, wherein it is determined in said retransmission-request processing control step whether one or more retransmission data packets associated with the retransmission request can be received in time for processing relating to playing of data contained in the one or more retransmission data packets, and it is determined that the retransmission request be transmitted on condition that the one or more retransmission data packets can be received in time, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

45. A computer readable storage medium storing a computer readable program for receiving streaming data, said computer readable program comprising the steps of:

a packet reception processing step of receiving a plurality of data packets transmitted from a data transmission apparatus; and a retransmission-request processing control step of determining whether to transmit a retransmission-request message packet that serves as a data-packet retransmission request to said data transmission apparatus, based on detection on a regular time interval of at least one of a lost packet and an error in the plurality of data packets transmitted from said data transmission apparatus, wherein said retransmission-request processing control step includes a step of determining whether one or more retransmission data packets associated with the retransmission request can be received in time for processing relating to playing of data contained in the one or more retransmission data packets, and determining that the retransmission request be transmitted on condition that the one or more retransmission data packets can be received in time, and the retransmission-request message packet includes at least one sequence number and an option field having one of a plurality of option values, each option value designating a retransmission mode including a first option value associated with designating retransmission of the packet with the sequence number, a second option value associated with designating retransmission of a range of packets ending with the sequence number, a third option value associated with designating retransmission of packets beginning with the sequence number, a fourth option value associated with designating retransmission of a plurality of packets based on a plurality of sequence numbers regardless of timestamps, and a fifth option value associated with designating retransmission of a range of packets associated with a timestamp.

* * * * *